(12) United States Patent
Ito

(10) Patent No.: US 7,158,698 B2
(45) Date of Patent: Jan. 2, 2007

(54) MODULE FOR AMPLIFYING SIGNAL LIGHT WITH REMOTE EXCITATION-LIGHT AND OPTICAL-FIBER COMMUNICATION SYSTEM INCLUDING THE SAME

(75) Inventor: Toshiharu Ito, Tokyo (JP)

(73) Assignee: NEC Corporation, Tokyo (JP)

(*) Notice: Subject to any disclaimer, the term of this patent is extended or adjusted under 35 U.S.C. 154(b) by 209 days.

(21) Appl. No.: 10/804,095

(22) Filed: Mar. 19, 2004

(65) Prior Publication Data
US 2005/0206998 A1 Sep. 22, 2005

(30) Foreign Application Priority Data
Mar. 19, 2003 (JP) ............................. 2003-075870

(51) Int. Cl.
| G02B 6/28 | (2006.01) |
| G02B 6/00 | (2006.01) |
| G02B 6/26 | (2006.01) |
| G02B 6/42 | (2006.01) |
| H04B 10/12 | (2006.01) |
| H04B 10/00 | (2006.01) |
| H01S 3/00 | (2006.01) |

(52) U.S. Cl. ................... 385/24; 385/14; 385/31; 398/141; 398/160; 359/341.1; 359/341.2

(58) Field of Classification Search .............. 385/24, 385/14, 31; 398/141, 160; 359/341.1, 341.2
See application file for complete search history.

(56) References Cited

U.S. PATENT DOCUMENTS 5,214,728 A * 5/1993 Shigematsu et al. .......... 385/24

6,377,393 B1 * 4/2002 Saeki ....................... 359/341.2
2004/0086246 A1 * 5/2004 Kosaka et al. .............. 385/123

FOREIGN PATENT DOCUMENTS

| JP | 5-335673 | 12/1993 |
| JP | 7-212316 | 8/1995 |
| JP | 2000-151521 A | 5/2000 |
| JP | 2001-28569 A | 1/2001 |
| JP | 2002-319726 A | 10/2002 |

OTHER PUBLICATIONS

Optical Fiber Communication (OFC) Conference, 2002, Technical Digest, pp. 606-608, Paper ThFF1.

* cited by examiner

Primary Examiner—Brian Healy
Assistant Examiner—Jerry Martin Blevins
(74) Attorney, Agent, or Firm—Foley & Lardner LLP

(57) ABSTRACT

A module for amplifying a signal light with a remote excitation-light, includes (a) a first optical input/output line through which a signal light is transmitted, (b) a second optical input/output line through which a signal light is transmitted, (c) an optical amplifier which amplifies a signal light on receipt of an excitation light transmitted through the first or second optical input/output line, (d) a bypass circuit which allows the signal light to bypass the optical amplifier, (e) a first optical connector which optically connects the first optical input/output line to the optical amplifier, and further optically connects the first optical input/output line to the bypass circuit, and (f) a second optical connector which optically connects the second optical input/output line to the optical amplifier, and further optically connects the second optical input/output line to the bypass circuit.

39 Claims, 18 Drawing Sheets

MODULE FOR AMPLIFYING SIGNAL LIGHT WITH REMOTE EXCITATION-LIGHT AND OPTICAL-FIBER COMMUNICATION SYSTEM INCLUDING THE SAME

BACKGROUND OF THE INVENTION

1. Field of the Invention

The invention relates to a module for amplifying a signal light with a remote excitation-light, and further to an optical-fiber communication system including the same.

2. Description of the Related Art

A transmission line in an optical long-range transmission system for transmitting an optical signal by hundreds of kilometers or longer is comprised usually of an optical transmission-line fiber, and an optical relay amplifier for compensating for attenuation of a signal light in the optical transmission-line fiber. A signal light is amplified in the optical amplifier, but receives a noise light while being amplified, resulting in reduction in an optical signal-noise ratio (SNR). Reduction in an optical SNR causes an error in received codes.

Reduction in an optical SNR is dependent on both an intensity with which a signal light is input into an optical amplifier, and how a signal light is amplified. The number of relays and stations in which relays are arranged much influences fabrication and running costs. Accordingly, it is desired to minimize the number of relays, that is, to lengthen a span between relays as much as possible. However, if a span between relays is lengthened without any compensation, an intensity with which a signal light is input into an optical amplifier would be reduced, that is, an optical SNR would be much reduced. Hence, a span between relays is determined, based on an optical SNR required after transmission of a signal light.

Lengthening a span between relays is a key for reducing costs of fabrication of an optical transmission system. Many solutions have been suggested for lengthening a span between relays.

What attracts attention as a solution effective for minimizing reduction in an optical SNR is a distribution Raman amplifying system used in an optical transmission-line fiber. This system is based on Raman scattering in an optical transmission-line fiber. One of advantages obtained by the distribution Raman amplifying system is that an existing transmission-line fiber can be used without any modification thereto, only if a filter for synthesizing a signal light and an excitation light with each other is arranged in a station, that is, an orientation and a wavelength direction of an optical transmission-line fiber are kept as they are.

A solution more effective than a distribution Raman amplifying system for minimizing reduction in an optical SNR is signal-light amplification with a remote excitation-light, in which there is used an optical fiber in which rare earth element is doped and which is used in an erbium-doped fiber amplifier (EDFA) which is a typical optical fiber amplifier into which rare earth element is doped, and an excitation light is transmitted from a remote relay station through an optical transmission-line fiber.

The amplification of a signal light with a remote excitation-light is not for lengthening a span between optical relay amplifiers. However, since a module for amplifying a signal light with a remote excitation-light, arranged in an optical transmission line, is comprised only of passive parts such as an erbium-doped fiber (EDF), it is not necessary to construct a station in which the module is to be installed, for controlling power supply and so on. Accordingly, the amplification of a signal light with a remote excitation-light lengthens a span between relay stations which span is most important for reducing running costs. Herein, passive parts mean parts capable of operating without receipt of electric energy.

Thus, the amplification of a signal light with a remote excitation-light is frequently applied to a field where it is difficult to supply power to an optical relay amplifier, or it would cost so much to do so. For instance, the amplification of a signal light with a remote excitation-light is applied to an optical submarine transmission system used for transmitting an optical signal in a relatively short range, specifically, in about hundreds of kilometers.

Hereinbelow is explained an optical transmission system to which the amplification of a signal light with a remote excitation-light is applied. FIG. 1 is block diagram of a conventional optical transmission system to which the amplification of a signal light with a remote excitation-light is applied, suggested in Optical Fiber Communication (OFC) Conference 2002, Technical Digest, pp. 606–608, paper ThFF1.

The optical transmission system illustrated in FIG. 1 is comprised of a module 303 for amplifying a signal light with a remote excitation-light, a first optical transmission-line fiber 302 optically connecting a first station 301 to the module 303, and a second optical transmission-line fiber 310 optically connecting a second station 308 to the module 303.

The module 303 is comprised of an optical amplifier 304 to which rare earth element is doped and which amplifies a signal light, a first filter 305a for synthesizing a signal light and an excitation light to each other, and optically connected to the optical amplifier 304, a second filter 305b for synthesizing a signal light and an excitation light to each other, and optically connected to the first filter 305a, a bypass circuit 306 through which the first and second filters 305a and 305b are optically connected to each other, and an isolator 307 optically connected to the first and second filters 305a and 305b between them for preventing a noise light from entering the optical amplifier 304.

In the second station 308 are arranged a third filter 305c for synthesizing a signal light and an excitation light to each other, and an excitation-light source 309 which transmits an excitation light by which the optical amplifier 304 is excited is arranged in the second station 308. The third filter 305c and the excitation-light source 309 are optically connected to each other.

A signal light transmitted from the first station 301 enters the module 303 through the first optical transmission-line fiber 302. The excitation light is transmitted to the optical amplifier 304 from the excitation-light source 309 through the third filter 305c, the second optical transmission-line fiber 310, the second filter 305b, the bypass circuit 306, and the first filter 305a. A noise light prevented by the isolator 307 from entering the optical amplifier 304 includes a reflected light resulted from reflection of a signal light in the second optical transmission-line fiber 310, and a light resulted from Raman scattering of an excitation light in the second optical transmission-line fiber 310.

The amplification of a signal light with a remote excitation-light is useful for an extension of a span between relays in a land transmission system, and further for reduction in costs in fabricating and running the system. However, the amplification of a signal light with a remote excitation-light is accompanied with problems. A part of the problems is caused that introduction of the amplification of a signal light with a remote excitation-light, that is, introduction of a module for amplifying a signal light with a remote excitation-light, into an optical transmission system will lose "transparency" of an optical transmission-line fiber.

The first problem is that the present amplification of a signal light with a remote excitation-light has orientation, in other words, the present amplification of a signal light with a remote excitation-light will lose "transparency" relating to orientation. Specifically, if the present amplification of a signal light with a remote excitation-light is introduced into an optical transmission system, it would be difficult for the optical transmission system to operate in an opposite direction. What spoils "transparency" is the isolator 307 as a part of the module 303 illustrated in FIG. 1.

The above-mentioned first problem exerts a harmful influence on a case in which the number of up-link and down-link transmission lines and a ratio of them are determined, taking estimated future demand into consideration, in an optical transmission system in which communication volume tends to be asymmetrical between up and down lines, for instance, in communication between a big city and a small city.

The second problem is caused by that "transparency" of an optical transmission line can be accomplished by an excitation light even in a direction in which an excitation-light amplifier operates. In other words, even if the amplification of a signal light with a remote excitation-light is not always necessary in cases, for instance, where communication volume is small, or a total transmission distance is short, it would be always necessary to introduce an excitation light into an optical amplifier. This is because an erbium-doped fiber (EDF) used for optical amplification would become absorptive medium, if not excited, and hence, a signal light could not pass through the fiber. Preparation of an excitation-light source which is not essentially necessary causes unnecessary increase in costs.

As is obvious in view of the above-mentioned problems, when an optical transmission line to which the present amplification of a signal light with a remote excitation-light is applied is constructed, it would be necessary to in advance determine how the optical transmission line is used. However, it is difficult to do so in an optical transmission line to be used for a land transmission system. This is because since construction of an optical transmission line to be used for a land transmission system costs so much, optical fibers are constructed at a time in number much greater than presently required. Accordingly, when constructed, how optical fibers are used is not determined frequently.

As one of the solutions to this problem, there may be constructed optical fibers without a module for amplifying a signal light with a remote excitation-light, optical fibers with such a module used only for up link, or optical fibers with such a module used only for down link. However, this causes another problem of an increase in optical transmission-line fibers which are not used.

The problem caused when the present amplification of a signal light with a remote excitation-light is applied to an optical transmission line to be used for a land transmission system is that it is necessary to determine how an optical transmission line is used, when the optical transmission line is constructed, and that the constructed optical transmission line has no flexibility for modification or addition thereof. That is, if the optical transmission line is used in other objects than originally designed, modification of the optical transmission line made for enhancing performance thereof might cause an increase in construction and/or running costs.

Japanese Patent Application Publication No. 5-335673 has suggested an optical circulator having a forward-transmission characteristic where a signal is transmitted from a first terminal to a second terminal, from a third terminal to a fourth terminal, and to the first terminal from the fourth terminal, characterized by an optical amplifier arranged between the second and third terminals.

Japanese Patent Application Publication No. 7-212316 has suggested an optical amplifier including first and second optical synthesizer/separators each having first to fourth terminals, and an optical amplifier. In each of the first and second optical synthesizer/separators, the first and third terminals are optically connected to each other for a first wavelength, the second and fourth terminals are optically connected to each other for the first wavelength, the first and fourth terminals are optically connected to each other for a second wavelength, and the second and third terminals are optically connected to each other for the second wavelength. The optical amplifier has an input terminal optically connected to the third terminal of the first optical synthesizer/separator, and an output terminal optically connected to the first terminal of the second optical synthesizer/separator. The second terminal of the first optical synthesizer/separator is optically connected to the second terminal of the second optical synthesizer/separator. The fourth terminal of the first optical synthesizer/separator is optically connected to the fourth terminal of the second optical synthesizer/separator. The first terminal of the first optical synthesizer/separator acts as an input/output terminal of a first optical transmission line, and the third terminal of the second optical synthesizer/separator acts as an input/output terminal of a second optical transmission line.

Japanese Patent Application Publication No. 2001-28569 has suggested a relay in an optical-fiber transmission system including a discrete amplifier operating in accordance with conductive Raman effect, and a residual pumping light is introduced into an input port of the relay in an anti-propagating direction.

Japanese Patent Application Publication No. 2000-151521 has suggested an optical transmission system including an optical fiber through which a signal light is transmitted, an optically amplifying fiber inserted into the optical fiber for amplifying the signal light, an excitation-light source from which an excitation light for exciting the optically amplifying fiber is transmitted, and means for multiplexing said excitation light with respect to a wavelength, and transmitting the thus multiplexed excitation light to the optical fiber.

Japanese Patent Application Publication No. 2002-319726 has suggested an optical amplifier including a first optically-amplifying medium receiving a signal light including a signal light having a first band and a signal light having a second band, and amplifying the signal having a first band, an optical separator which directs almost all lights to a first optical path, and the rest to a second path among lights having been output from the first optically-amplifying medium, a second optically-amplifying medium arranged on the second optical path for amplifying the signal light having a second band, and an optical synthesizer which synthesizes a light transmitted through the first optical path with the signal light having a second band, and outputs the thus synthesized lights to an output terminal.

SUMMARY OF THE INVENTION

In view of the above-mentioned problems in the prior art, it is an object of the present invention to provide a module for amplifying a signal light with a remote excitation-light which module has flexibility to various factors such as a direction in which a signal light is transmitted, a total transmission distance, and total transmission volume.

It is also an object of the present invention to provide an optical-fiber communication system including such a module.

In one aspect of the present invention, there is provided a module for amplifying a signal light with a remote excitation-light, including (a) a first optical input/output line through which a signal light is transmitted, (b) a second optical input/output line through which a signal light is transmitted, (c) an optical amplifier which amplifies a signal light on receipt of an excitation light transmitted through the first or second optical input/output line, (d) a bypass circuit which allows the signal light to bypass the optical amplifier, (e) a first optical connector which optically connects the first optical input/output line to the optical amplifier, and further optically connects the first optical input/output line to the bypass circuit, and (f) a second optical connector which optically connects the second optical input/output line to the optical amplifier, and further optically connects the second optical input/output line to the bypass circuit.

For instance, the first optical connector may be comprised of a first optical 3-port circulator having first, second and third ports wherein a signal light input through the second port is output through the third port, a signal light input through the first port is output through the second port, and a signal light input through the third port is not output through any ports, and the second optical connector may be comprised of a second optical 3-port circulator having first, second and third ports wherein a signal light input through the second port is output through the third port, a signal light input through the first port is output through the second port, and a signal light input through the third port is not output through any ports, in which case, the first optical 3-port circulator is optically connected at its second port to the first optical input/output line, at its third port to the optical amplifier, and at its first port to the bypass circuit, and the second optical 3-port circulator is optically connected at its second port to the second optical input/output line, at its third port to the bypass circuit, and at its first port to the optical amplifier.

For instance, the first optical connector may be comprised of a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and the second optical connector may be comprised of a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, in which case, the first optical filter is optically connected at its second port to the first optical input/output line, at its third port to the optical amplifier, and at its first port to the bypass circuit, and the second optical filter is optically connected at its second port to the second optical input/output line, at its third port to the bypass circuit, and at its first port to the optical amplifier.

For instance, the first optical connector may be comprised of a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and the second optical connector may be comprised of a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, in which case, the first optical filter is optically connected at its second port to the first optical input/output line, at its third port to the bypass circuit, and at its first port to the optical amplifier, and the second optical filter is optically connected at its second port to the second optical input/output line, at its third port to the bypass circuit, and at its first port to the optical amplifier.

It is preferable that the bypass circuit has the same structure as that of the optical amplifier.

For instance, the first optical connector, the second optical connector and the bypass circuit may be comprised of an optical 4-port circulator having first, second, third and fourth ports wherein a signal light input through the third port is output through the fourth port, a signal light input through the first port is output through the second port, a signal light input through the second port is output through the third port, and a signal light input through the fourth port is not output through any ports, in which case, the optical 4-port circular is optically connected at its third port to the first optical input/output line, at its fourth port to the optical amplifier at one end thereof, at its first port to the optical amplifier at the other end thereof, and at its second port to the second optical input/output line.

It is preferable that the optical amplifier includes optically amplifying medium comprised of an optical fiber into which rare earth element is doped.

It is preferable that the excitation light to be transmitted to the optical amplifier is one of a forward excitation light and a backward excitation light.

The module may further include at least one optical isolator, and at least one device for compensating for optical dispersion, both arranged between the optical amplifier and at least one of the first and second optical connectors.

In another aspect of the present invention, there is provided a module for amplifying a signal light with a remote excitation-light, including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (i) a second bypass circuit which allows the signal light to bypass the optical amplifier, wherein the first optical 3-port circulator is optically connected at its second port to the first optical input/output line, at its third port to the first optical filter, and at its first port to the first bypass circuit, the second optical 3-port circulator is optically connected at its second port to the second optical input/output line, at its third port to the first bypass circuit, and at its first port to the second optical filter, the first optical filter is optically connected at its second port to the first optical 3-port circulator, at its third port to the optical amplifier, and at its first port to the second bypass circuit, and the second optical filter is optically connected at its second port to the second optical 3-port calculator, at its third port to the optical amplifier, and at its first port to the second bypass circuit.

There is further provided a module for amplifying a signal light with a remote excitation-light, including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (i) a second optical amplifier which amplifies a signal light on receipt of an excitation light transmitted through the first or second optical input/output line, (j) a second bypass circuit which allows the signal light to bypass the second optical amplifier, (k) a third optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (l) a fourth optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, wherein the first optical 3-port circulator is optically connected at its second port to the first optical input/output line, at its third port to the first optical filter, and at its first port to the fourth optical filter, the second optical 3-port circulator is optically connected at its second port to the second optical input/output line, at its third port to the third optical filter, and at its first port to the second optical filter, the first optical filter is optically connected at its second port to the first optical 3-port circulator, at its third port to the first optical amplifier, and at its first port to the first bypass circuit, and the second optical filter is optically connected at its second port to the second optical 3-port circulator, at its third port to the third optical filter, and at its first port to the first bypass filter, the third optical filter is optically connected at its second port to the second optical 3-port circulator, at its first port to the second optical amplifier, and at its third port to the second bypass circuit, and the fourth optical filter is optically connected at its second port to the first optical 3-port calculator, at its first port to the second optical amplifier, and at its third port to the second bypass circuit.

There is further provided a module for amplifying a signal light with a remote excitation-light, including (a) a first optical input/output line through which a signal light is transmitted, (b) a second optical input/output line through which a signal light is transmitted, (c) a first optical 3-port circulator having first, second and third ports wherein a signal light input through the second port is output through the first port, a signal light input through the third port is output through the second port, and a signal light input through the first port is not output through any ports, (d) a second optical 3-port circulator having first, second and third ports wherein a signal light input through the second port is output through the first port, a signal light input through the third port is output through the second port, and a signal light input through the first port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the first port is a port through which a signal light having the first wavelength band is input and output, and the third port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the first port is a port through which a signal light having the first wavelength band is input and output, and the third port is a port through which a signal light having the second wavelength band is input and output, and (i) a second bypass circuit which allows the signal light to bypass the optical amplifier, wherein the first optical 3-port circulator is optically connected at its second port to the second optical input/output line, at its third port to the second optical filter, and at its first port to the first bypass circuit, the second optical 3-port circulator is optically connected at its second port to the first optical input/output line, at its third port to the first bypass circuit, and at its first port to the first optical filter, the first optical filter is optically connected at its second port to the second optical 3-port circulator, at its third port to the second bypass circuit, and at its first port to the optical amplifier, and the second optical filter is optically connected at its second port to the first optical 3-port calculator, at its third port to the second bypass circuit, and at its first port to the optical amplifier.

There is further provided a module for amplifying a signal light with a remote excitation-light, including (a) a first optical input/output line through which a signal light is transmitted, (b) a second optical input/output line through which a signal light is transmitted, (c) a first optical amplifier which amplifies a signal light on receipt of an excitation light transmitted through the first or second optical input/output line, (d) a second optical amplifier which amplifies a signal light on receipt of an excitation light transmitted through the first or second optical input/output line, (e) a first optical 3-port circulator having first, second and third ports wherein a signal light input through the second port is output through the third port, a signal light input through the first port is output through the second port, and a signal light input through the third port is not output through any ports, and (f) a second optical 3-port circulator having first, second and third ports wherein a signal light input through the second port is output through the third port, a signal light input through the first port is output through the second port, and a signal light input through the third port is not output through any ports, the first optical 3-port circulator is optically connected at its second port to the first optical input/output line, at its third port to the first optical amplifier, and at its first port to the second optical amplifier, and the second optical 3-port circulator is optically connected at its second port to the second optical input/output line, at its third port to the second optical amplifier, and at its first port to the first optical amplifier.

In another aspect of the present invention, there is further provided an optical-fiber communication system allowing first and second sites to make optical communication therebetween, including (a) at least one module for amplifying a signal light with a remote excitation-light, (b) a first optical fiber optically connecting the module to the first site, and (c) a second optical fiber optically connecting the module to the second site, the module including (a) a first optical input/output line through which a signal light is transmitted, (b) a second optical input/output line through which a signal light is transmitted, (c) an optical amplifier which amplifies a signal light on receipt of an excitation light transmitted through the first or second optical input/output line, (d) a bypass circuit which allows the signal light to bypass the optical amplifier, (e) a first optical 3-port circulator having first, second and third ports wherein a signal light input through the second port is output through the third port, a signal light input through the first port is output through the second port, and a signal light input through the third port is not output through any ports, and (f) a second optical 3-port circulator having first, second and third ports wherein a signal light input through the second port is output through the third port, a signal light input through the first port is output through the second port, and a signal light input through the third port is not output through any ports, wherein the first optical 3-port circulator is optically connected at its second port to the first optical input/output line, at its third port to the optical amplifier, and at its first port to the bypass circuit, the second optical 3-port circulator is optically connected at its second port to the second optical input/output line, at its third port to the bypass circuit, and at its first port to the optical amplifier, the first optical input/output line is optically connected to the first optical fiber, and the second optical input/output line is optically connected to the second optical fiber.

There is further provided an optical-fiber communication system allowing first and second sites to make optical communication therebetween, including (a) at least one module for amplifying a signal light with a remote excitation-light, (b) a first optical fiber optically connecting the module to the first site, and (c) a second optical fiber optically connecting the module to the second site, the module including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (i) a second bypass circuit which allows the signal light to bypass the optical amplifier, wherein the first optical 3-port circulator is optically connected at its second port to the first optical input/output line, at its third port to the first optical filter, and at its first port to the first bypass circuit, the second optical 3-port circulator is optically connected at its second port to the second optical input/output line, at its third port to the first bypass circuit, and at its first port to the second optical filter, the first optical filter is optically connected at its second port to the first optical 3-port circulator, at its third port to the optical amplifier, and at its first port to the second bypass circuit, and the second optical filter is optically connected at its second port to the second optical 3-port calculator, at its third port to the optical amplifier, and at its first port to the second bypass circuit.

There is further provided an optical-fiber communication system allowing first and second sites to make optical communication therebetween, including (a) at least one module for amplifying a signal light with a remote excitation-light, (b) a first optical fiber optically connecting the module to the first site, and (c) a second optical fiber optically connecting the module to the second site, the module including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (i) a second bypass circuit which allows the signal light to bypass the optical amplifier, wherein the first optical 3-port circulator is optically connected at its second port to the first optical input/output line, at its third port to the first optical filter, and at its first port to the first bypass circuit, the second optical 3-port circulator is optically connected at its second port to the second optical input/output line, at its third port to the first bypass circuit, and at its first port to the second optical filter, the first optical filter is optically connected at its second port to the first optical 3-port circulator, at its first port to the optical amplifier, and at its third port to the second bypass circuit, and the second optical filter is optically connected at its second port to the second optical 3-port calculator, at its first port to the optical amplifier, and at its third port to the second bypass circuit.

There is further provided an optical-fiber communication system allowing first and second sites to make optical communication therebetween, including (a) at least one module for amplifying a signal light with a remote excitation-light, (b) a first optical fiber optically connecting the module to the first site, and (c) a second optical fiber optically connecting the module to the second site, the module including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) a first optical amplifier which amplifies a signal light on receipt of an excitation light transmitted through the first or second optical input/output line, (f) a first bypass circuit which allows the signal light to bypass the first optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (i) a second optical amplifier which amplifies a signal light on receipt of an excitation light transmitted through the first or second optical input/output line, (j) a second bypass circuit which allows the signal light to bypass the second optical amplifier, (k) a third optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (l) a fourth optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, wherein the first optical 3-port circulator is optically connected at its second port to the first optical input/output line, at its third port to the first optical filter, and at its first port to the fourth optical filter, the second optical 3-port circulator is optically connected at its second port to the second optical input/output line, at its third port to the third optical filter, and at its first port to the second optical filter, the first optical filter is optically connected at its second port to the first optical 3-port circulator, at its first port to the first optical amplifier, and at its first port to the first bypass circuit, the second optical filter is optically connected at its second port to the second optical circulator, at its third port to the third optical filter, and at its first port to the first bypass filter, the third optical filter is optically connected at its second port to the second optical 3-port circulator, at its first port to the second optical amplifier, and at its third port to the second bypass circuit, and the fourth optical filter is optically connected at its second port to the first optical 3-port calculator, at its first port to the second optical amplifier, and at its third port to the second bypass circuit.

There is further provided an optical-fiber communication system allowing first and second sites to make optical communication therebetween, including (a) a first module for amplifying a signal light with a remote excitation-light, located at a first site, and (b) a second module for amplifying a signal light with a remote excitation-light, located at a second site, the second module having the same structure as that of the first module, the first module including: (a) a first optical input/output line through which a signal light is transmitted, (b) a second optical input/output line through which a signal light is transmitted, (c) an optical amplifier which amplifies a signal light on receipt of an excitation light transmitted through the first or second optical input/output line, (d) a bypass circuit which allows the signal light to bypass the optical amplifier, (e) a first optical 3-port circulator having first, second and third ports wherein a signal light input through the second port is output through the third port, a signal light input through the first port is output through the second port, and a signal light input through the third port is not output through any ports, and (f) a second optical 3-port circulator having first, second and third ports wherein a signal light input through the second port is output through the third port, a signal light input through the first port is output through the second port, and a signal light input through the third port is not output through any ports, wherein the first optical 3-port circulator is optically connected at its second port to the first optical input/output line, at its third port to the optical amplifier, and at its first port to the bypass circuit, the second optical 3-port circulator is optically connected at its second port to the second optical input/output line, at its third port to the bypass circuit, and at its first port to the optical amplifier, the first optical input/output line is optically connected to the first optical fiber, and the second optical input/output line is optically connected to the second optical fiber, wherein the first optical input/output line of the first module is optically connected to the first optical input/output line of the second module through a first optical fiber, the second optical input/output line of the first module is optically connected to the first site through a second optical fiber, and the second optical input/output line of the second module is optically connected to the second site through a third optical fiber.

There is further provided an optical-fiber communication system allowing first and second sites to make optical communication therebetween, including (a) a first module for amplifying a signal light with a remote excitation-light, located at a first site, and (b) a second module for amplifying a signal light with a remote excitation-light, located at a second site, the second module having the same structure as that of the first module, the first module including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (i) a second bypass circuit which allows the signal light to bypass the optical amplifier, wherein the first optical 3-port circulator is optically connected at its second port to the first optical input/output line, at its third port to the first optical filter, and at its first port to the first bypass circuit, the second optical 3-port circulator is optically connected at its second port to the second optical input/output line, at its third port to the first bypass circuit, and at its first port to the second optical filter, the first optical filter is optically connected at its second port to the first optical 3-port circulator, at its third port to the optical amplifier, and at its first port to the second bypass circuit, and the second optical filter is optically connected at its second port to the second optical 3-port calculator, at its third port to the optical amplifier, and at its first port to the second bypass circuit, wherein the first optical input/output line of the first module is optically connected to the first optical input/output line of the second module through a first optical fiber, the second optical input/output line of the first module is optically connected to the first site through a second optical fiber, and the second optical input/output line of the second module is optically connected to the second site through a third optical fiber.

There is further provided an optical-fiber communication system allowing first and second sites to make optical communication therebetween, including (a) a first module for amplifying a signal light with a remote excitation-light, located at a first site, and (b) a second module for amplifying a signal light with a remote excitation-light, located at a second site, the second module having the same structure as that of the first module, the first module including (a) a first optical input/output line through which a signal light is transmitted, (b) a second optical input/output line through which a signal light is transmitted, (c) a first optical 3-port circulator having first, second and third ports wherein a signal light input through the second port is output through the third port, a signal light input through the first port is output through the second port, and a signal light input through the third port is not output through any ports, (d) a second optical 3-port circulator having first, second and third ports wherein a signal light input through the second port is output through the third port, a signal light input through the first port is output through the second port, and a signal light input through the third port is not output through any ports, (e) an optical amplifier which amplifies a signal light on receipt of an excitation light transmitted through the first or second optical input/output line, (f) a first bypass circuit which allows the signal light to bypass the optical amplifier, (g) a first optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, (h) a second optical filter having first, second and third ports wherein the second port is a port through which a signal light comprised of a signal light having a first wavelength band and a signal light having a second wavelength band, combined to each other, is input and output, the third port is a port through which a signal light having the first wavelength band is input and output, and the first port is a port through which a signal light having the second wavelength band is input and output, and (i) a second bypass circuit which allows the signal light to bypass the optical amplifier, wherein the first optical 3-port circulator is optically connected at its second port to the first optical input/output line, at its third port to the first optical filter, and at its first port to the first bypass circuit, the second optical 3-port circulator is optically connected at its second port to the second optical input/output line, at its third port to the first bypass circuit, and at its first port to the second optical filter, the first optical filter is optically connected at its second port to the first optical 3-port circulator, at its first port to the optical amplifier, and at its third port to the second bypass circuit, and the second optical filter is optically connected at its second port to the second optical 3-port calculator, at its first port to the optical amplifier, and at its third port to the second bypass circuit, wherein the first optical input/output line of the first module is optically connected to the first optical input/output line of the second module through a first optical fiber, the second optical input/output line of the first module is optically connected to the first site through a second optical fiber, and the second optical input/output line of the second module is optically connected to the second site through a third optical fiber.

There is further provided an optical-fiber communication system allowing first and second sites to make optical communication therebetween, including (a) a first module for amplifying a signal light with a remote excitation-light, located at a first site, and (b) a second module for amplifying a signal light with a remote excitation-light, located at a second site, wherein the first module is selected from a group consisting of the thirdly, tenthly, eleventhly, twelfthly and thirteenthly mentioned modules, the second module is selected from a group consisting of the fourthly, fourteenthly, fifteenthly, sixteenthly and seventeenthly mentioned modules, the first optical input/output line of the first module is optically connected to the first optical input/output line of the second module through a first optical fiber, the second optical input/output line of the first module is optically connected to the first site through a second optical fiber, and the second optical input/output line of the second module is optically connected to the second site through a third optical fiber.

It is preferable that the module further includes at least one optical isolator, and at least one device for compensating for optical dispersion, both arranged between the optical amplifier and at least one of the first and second optical connectors, and dispersion compensation in the device is equal to smaller one of first and second factors wherein the first factor is defined as wavelength dispersion stored in a signal light in the first and second optical fibers, with an error of about 10%, and the second factor is defined as compensation provided by a dispersion-compensation device having optical loss equal to or smaller than a gain of the module.

There is further provided an optical-fiber communication system allowing first and second sites to make optical communication therebetween, including (a) a first module comprised of the thirteenthly mentioned module, and (b) a second module comprised of the seventeenthly mentioned module, wherein the first optical input/output line of the first module is optically connected to the first optical input/output line of the second module through a first optical fiber, the second optical input/output line of the first module is optically connected to the first site through a second optical fiber, the second optical input/output line of the second module is optically connected to the second site through a third optical fiber, and dispersion compensation in the device is equal to smaller one of first and second factors wherein the first factor is defined as wavelength dispersion stored in a signal light in the first and second optical fibers, with an error of about 10%, and the second factor is defined as compensation provided by a dispersion-compensation device having optical loss equal to or smaller than a gain of the module.

The advantages obtained by the aforementioned present invention will be described hereinbelow.

The module and the optical-fiber communication system both in accordance with the present invention are applicable to various uses, and hence, provides advantages that accuracy with which how an optical transmission line to which the amplification of a signal light with a remote excitation-light is applied is used is determined in advance can be reduced, the module and the optical-fiber communication system could have flexibility to modification in how they are used, performances of the module and the optical-fiber communication system can be gradually enhanced, and so on.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
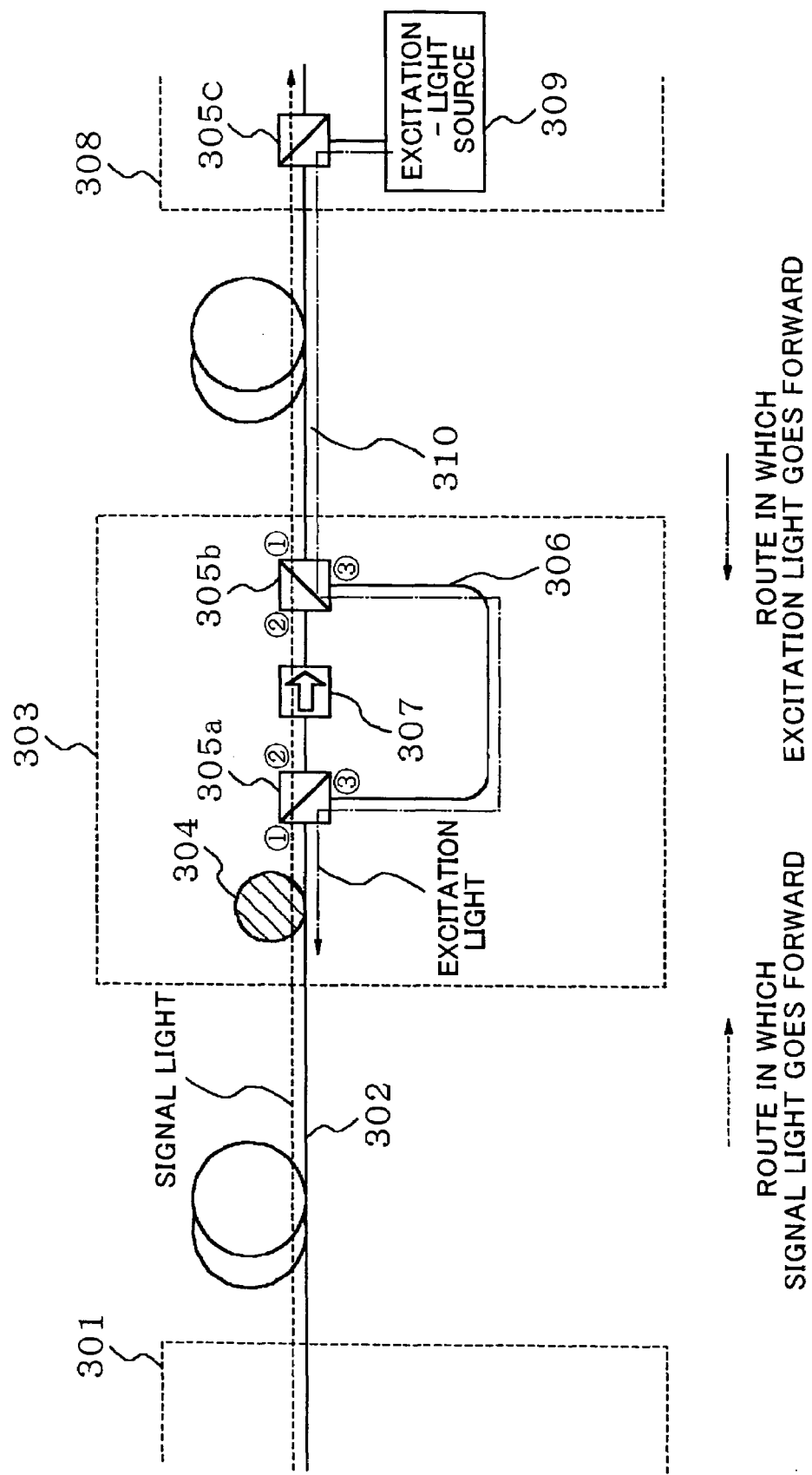
FIG. 1 is block diagram of a conventional optical-fiber communication system to which the amplification of a signal light with a remote excitation-light is applied.
Figure 2:
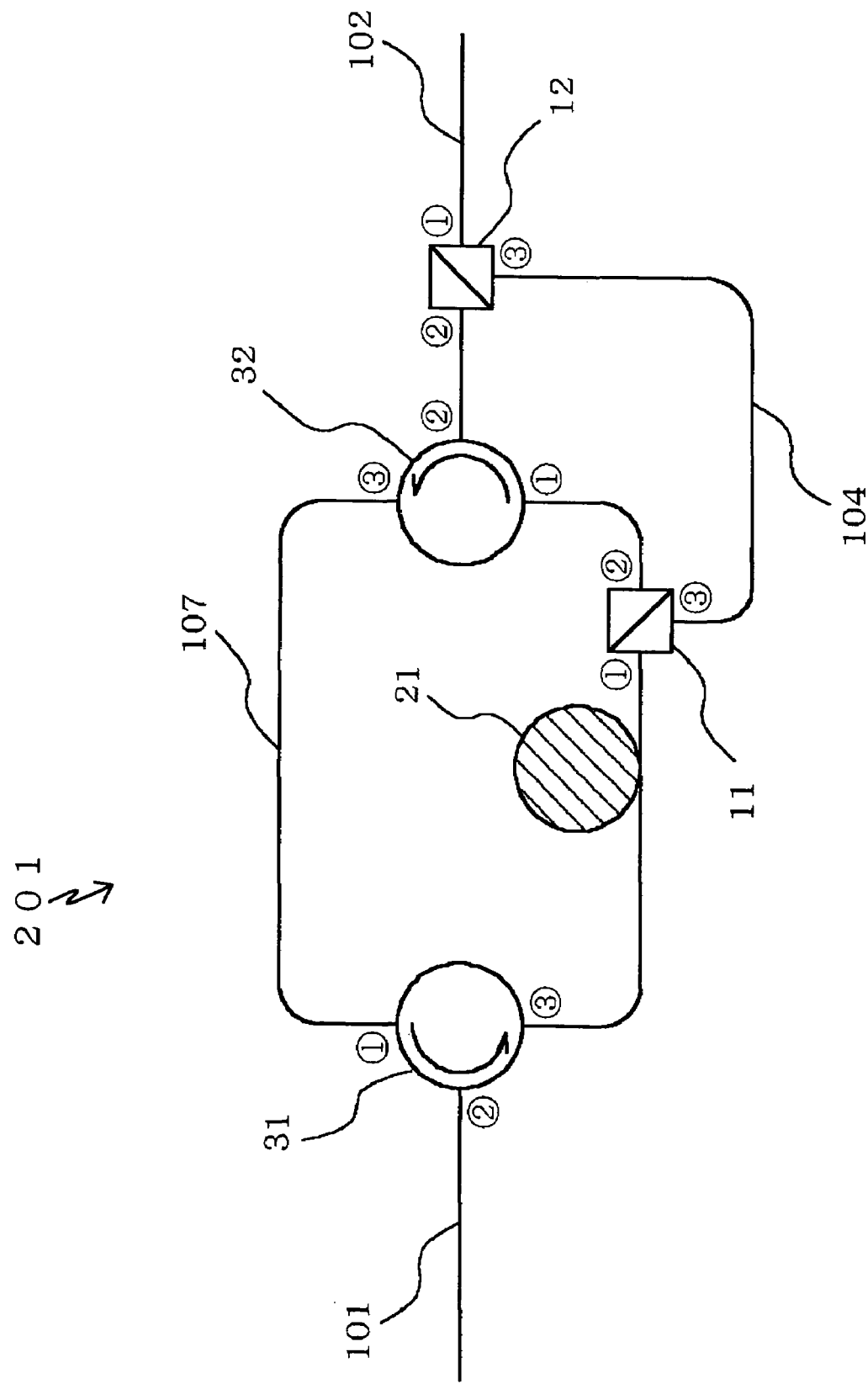
FIG. 2 is a block diagram of a module for amplifying a signal light with a remote excitation-light, in accordance with the first embodiment of the present invention.

FIG. 2 is a block diagram of a module 201 for amplifying a signal light with a remote excitation-light, in accordance with the first embodiment of the present invention.

The module 201 is comprised of a first optical input/output line 101 through which a signal light is transmitted, a second optical input/output line 102 through which a signal light is transmitted, an optical amplifier 21 which amplifies a signal light on receipt of an excitation light transmitted from an excitation-light source (not illustrated) through the second optical input/output line 102, a first bypass circuit 107 optically connected to later mentioned first and second optical connectors 31 and 32 to allow a signal light to bypass the optical amplifier 21, a first optical connector 31 which optically connects the first optical input/output line 101 to the optical amplifier 21, and further optically connects the first optical input/output line 101 to the first bypass circuit 107, a second optical connector 32 which optically connects the second optical input/output line 102 to the optical amplifier 21, and further optically connects the second optical input/output line 102 to the first bypass circuit 107, a first filter 11 for synthesizing a signal light and an excitation light to each other and separating a signal light and an excitation light from each other, arranged in an optical transmission line between the optical amplifier 21 and the second optical connector 32, a second filter 12 for synthesizing a signal light and an excitation light to each other and separating a signal light and an excitation light from each other, arranged in an optical transmission line between the excitation-light source (not illustrated) and the second optical connector 32, and a second bypass circuit 104 optically connecting the first and second filters 11 and 12 therethrough for allowing an excitation light to bypass the second optical connector 32.

The optical amplifier 21 includes optical fibers to which rare earth element is doped.

In the first embodiment, the first optical connector 31 is comprised of a first optical 3-port circulator having first, second and third ports, and the second optical connector 32 is comprised of a second optical 3-port circulator having first, second and third ports. In FIG. 2, the first ports in the first and second optical 3-port circulators 31 and 32 are indicated with a reference number ①. Similarly, the second and third ports are indicated with reference numerals ② and ③, respectively.

The first optical 3-port circulator 31 operates as follows. As indicated with an arrow, a signal light input through the second port ② is output through the third port ③, a signal light input through the first port ① is output through the second port ②, and a signal light input through the third port ③ is not output through any ports. The second optical 3-port circulator 32 operates in the same way as the first optical 3-port circulator 31.

The first optical 3-port circulator 31 is optically connected at its second port ② to the first optical input/output line 101, at its third port ③ to the optical amplifier 21, and at its first port ① to the first bypass circuit 107.

The second optical 3-port circulator 32 is optically connected at its second port ② to the second optical input/output line 102, at its third port ③ to the first bypass circuit 107, and at its first port ① to the optical amplifier 21.

A first signal light input into the module 201 through the first optical input/output line 101 is transmitted to the optical amplifier 21 through the first optical 3-port circulator 31. A light including an excitation light for exciting the optical amplifier 12 is transmitted from an excitation-light source (not illustrated) through the second optical input/output line 102. An excitation light is separated from the light in the second filter 12, and then, transmitted to the optical amplifier 12 through the second bypass circuit 104 and the first filter 11.

A signal light having been amplified in the optical amplifier 21 is output to the second optical input/output line 102 through the first filter 11, the second optical 3-port circulator 32, and the second filter 12.

When a signal light is input through the second optical input/output line 102, the signal light is output from the module 201 without being amplified, through the second filter 12, the second optical 3-port circulator 32, the first bypass circuit 107, the first optical 3-port circulator 31, and the first optical input/output line 101.

In the module 201 in accordance with the first embodiment, a first signal light input through the first optical input/output line 101 is amplified in the optical amplifier 21 excited on receipt of a backward excitation light transmitted through the second optical input/output line 102, and then, is transmitted to the second optical input/output line 102. On the other hand, a second signal light input through the second optical input/output line 102 is transmitted to the first optical input/output line 101, bypassing the optical amplifier 21. Accordingly, the module 201 in accordance with the first embodiment is useful when the first signal light is a high transmission-capacity signal, and is necessary to be relayed and amplified, and the second light is a small transmission-capacity signal or is transmitted by a small distance, and is not necessary to be relayed and amplified.

[Second Embodiment]

Figure 3:
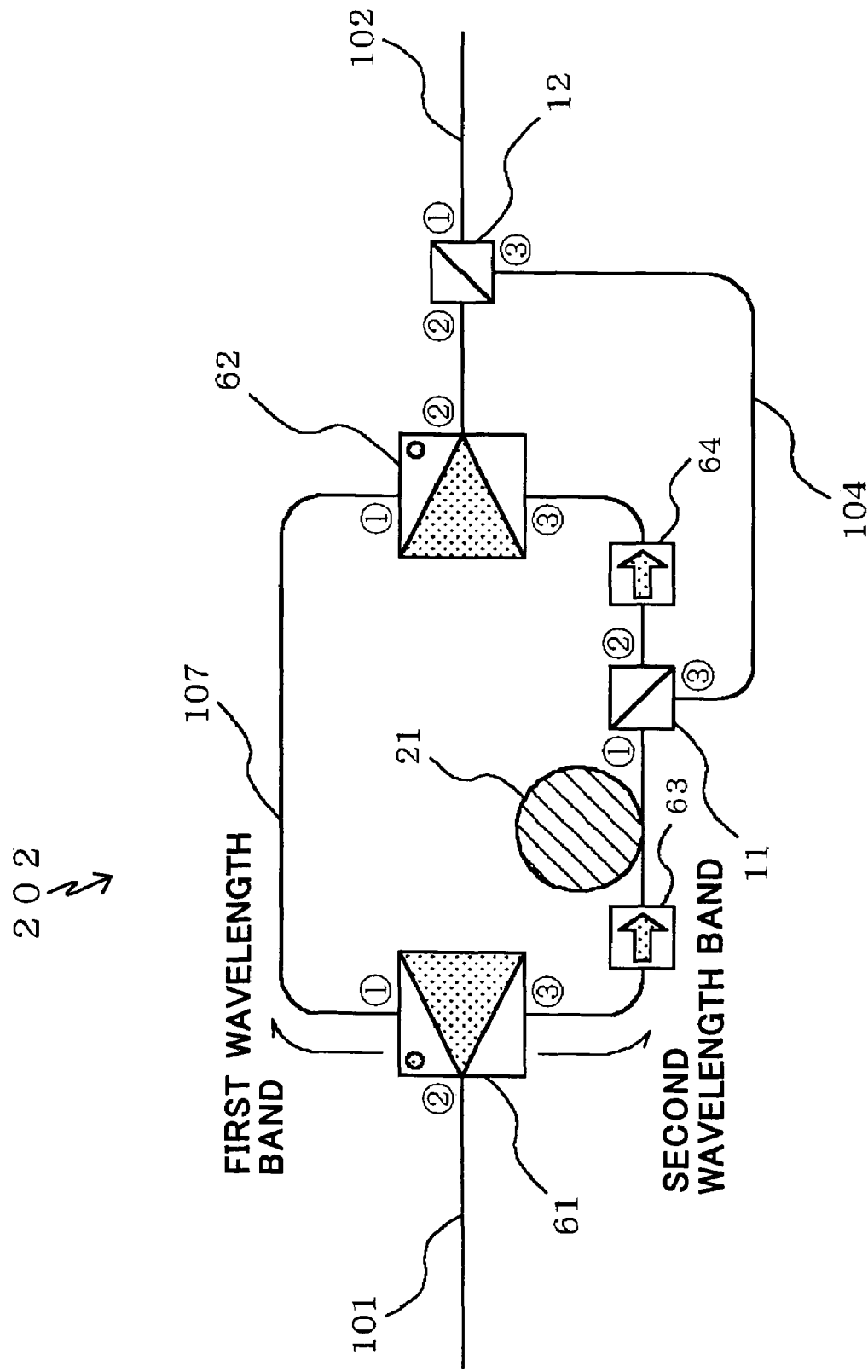
FIG. 3 is a block diagram of a module for amplifying a signal light with a remote excitation-light, in accordance with the second embodiment of the present invention.

FIG. 3 is a block diagram of a module 202 for amplifying a signal light with a remote excitation-light, in accordance with the second embodiment of the present invention.

The module 202 is structurally different from the module 201 illustrated in FIG. 2 in that the module 202 includes third and fourth filters 61 and 62 in place of the first and second optical 3-port circulators 31 and 32, and that the module 202 further includes first and second isolators 63 and 64.

The first isolator 63 is located between the third filter 61 and the optical amplifier 21, and the second isolator 64 is located between the first filter 11 and the fourth filter 62.

The third filter 61 has first, second and third ports. The second port ② is a port through which a signal light comprised of a signal light having a first wavelength band and a signal light having a second wavelength band, combined to each other, is input and output, the first port ① is a port through which a signal light having the first wavelength band is input and output, and the third port ③ is a port through which a signal light having the second wavelength band is input and output.

The third filter 61 is optically connected at its second port ② to the first optical input/output line 101, at its third port ③ to the optical amplifier 21 through the first isolator 63, and at its first port ① to the first bypass circuit 107.

The fourth filter 62 is optically connected at its second port ② to the second optical input/output line 102, at its third port ③ to the optical amplifier 21 through the second isolator 64, and at its first port ① to the first bypass circuit 107.

The third filter 61 receives a light having a first group of wavelengths and a light having a second group of wavelengths which is different from the first group of wavelengths, through a common input port, separates the thus received lights into a light having the first group of wavelengths and a light having the second group of wavelengths, and outputs the thus separated lights through separate output ports. As a reciprocal action, the third filter 61 receives a light having a first group of wavelengths, through a first input port, and a light having a second group of wavelengths, through a second input port, synthesizes the received lights to each other, and outputs the thus synthesized lights through an output port. The fourth filter 62 operates in the same way as the third filter 61. For instance, the third and fourth filters 61 and 62 may be comprised of an interference filter having a multi-layered structure including a plurality of dielectric layers.

A signal light input through the first optical input/output line 101 is separated by the third filter 61 into lights of first and second wavelength bands. A light having a first wavelength band is output to the second optical input/output line 102 through the first bypass circuit 107, the fourth filter 62, and the second filter 12. A light having a second wavelength band passes through the first isolator 63, and then, is amplified in the optical amplifier 21. The thus amplified light is output to the second optical input/output line 102 through the first filter 11, the second isolator 64, the fourth filter 62, and the second filter 12.

An excitation light used for causing the light having a second wavelength band to be amplified in the optical amplifier 21 is transmitted to the optical amplifier 21 from an excitation-light source (not illustrated) through the second optical input/output line 102, the second filter 12, the second bypass circuit 104, and the first filter 11.

In the module 202 in accordance with the second embodiment, a light having a second wavelength band is transmitted in a fixed direction, that is, a direction to the second optical input/output line 102 from the first optical input/output line 101. In contrast, a light having a first wavelength band is transmitted not only in a direction to the second optical input/output line 102 from the first optical input/output line 101, but also in the opposite direction.

[Third Embodiment]

A module having a function symmetrical with the function of the module 202 illustrated in FIG. 3 may be more effectively used than the module 202. In such a module, a light having a first wavelength band is transmitted in a fixed direction, whereas a light having a second wavelength band is transmitted in opposite directions. Such a module is explained hereinbelow as a module 203 in accordance with the third embodiment.

Figure 4:
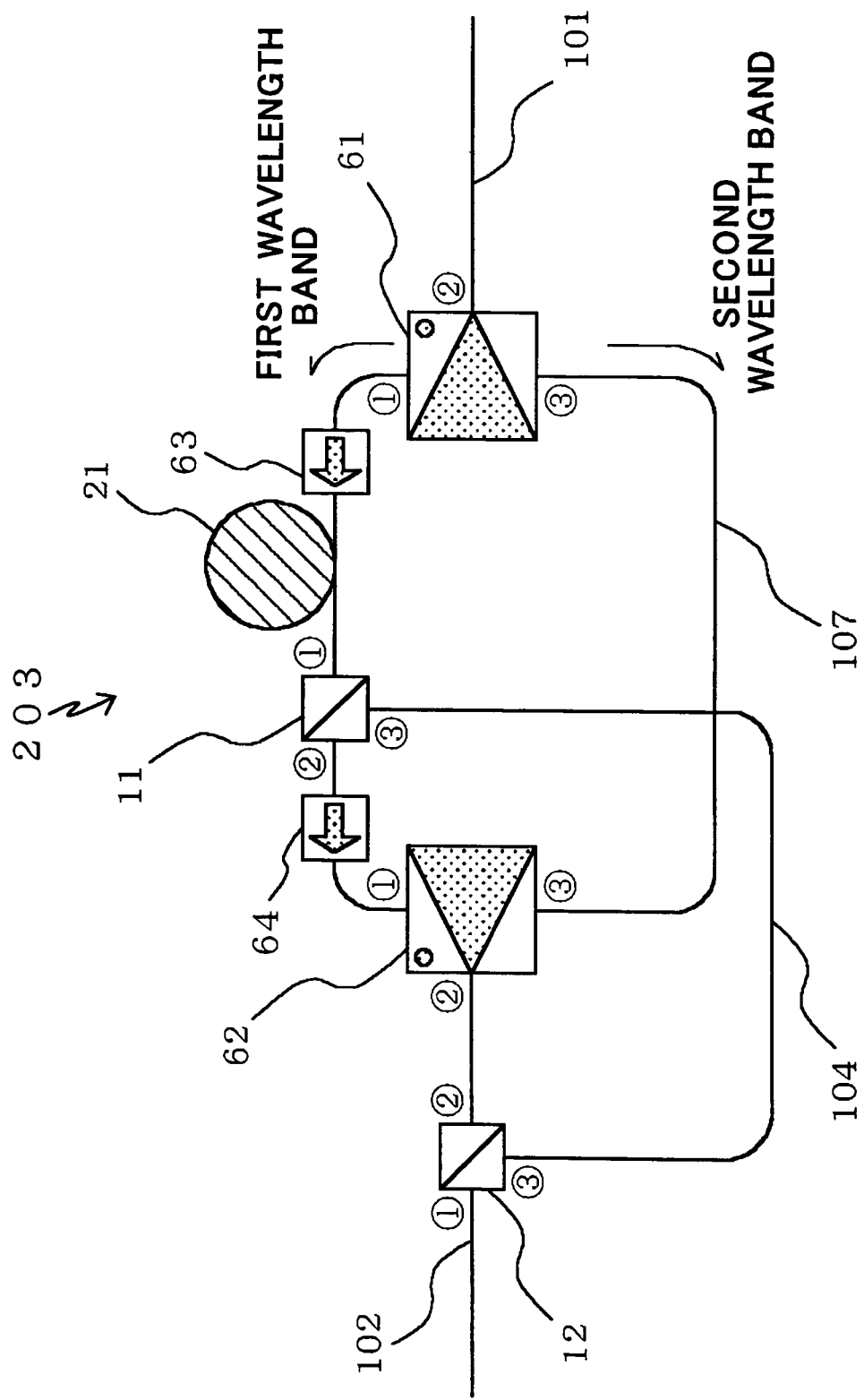
FIG. 4 is a block diagram of a module for amplifying a signal light with a remote excitation-light, in accordance with the third embodiment of the present invention.

FIG. 4 is a block diagram of a module 203 for amplifying a signal light with a remote excitation-light, in accordance with the third embodiment of the present invention.

The module 203 is structurally different from the module 202 illustrated in FIG. 3 in port-arrangement in the third and fourth filters 61 and 62.

The third filter 61 has first, second and third ports. The second port ② is a port through which a signal light comprised of a signal light having a first wavelength band and a signal light having a second wavelength band, combined to each other, is input and output, the first port ① is a port through which a signal light having the first wavelength band is input and output, and the third port ③ is a port through which a signal light having the second wavelength band is input and output.

The third filter 61 is optically connected at its second port ② to the first optical input/output line 101, at its third port ③ to the first bypass circuit 107, and at its first port ① to the optical amplifier 21 through the first isolator 63. The fourth filter 62 is optically connected at its second port ② to the second optical input/output line 102, at its third port ③ to the first bypass circuit 107, and at its first port ① to the optical amplifier 21 through the second isolator 64.

Among signal lights input through the first optical input/output line 101, only signal lights having a first wavelength band is amplified, and signal lights having a second wavelength band is output through the second optical input/output line 102, bypassing the optical amplifier 21 through the first bypass circuit 107, without being amplified. Signal lights having a second wavelength band are allowed to be input through the second optical input/output line 102, and to be output through the first optical input/output line 101.

First and second wavelength bands are determined in dependence on a use of a module. For instance, if they are determined in accordance with a storage capacity, a first wavelength band may be determined as C-band ranging from 1530 to 1565 nanometers, and a second wavelength band may be determined as L-band ranging from 1570 to 1605 nanometers.

As an alternative, first and second wavelength bands may be determined as two bands within C- or L-band. This provides only a small storage capacity, but provides an advantage that an optical amplifier may be used commonly in opposite directions, whereas two or more optical amplifiers have to be prepared when first and second wavelength bands are determined as C- and L-bands, because optical amplifiers required in amplification in C- and L-bands are different from each other with respect to a kind and/or a length.

[Fourth Embodiment]

Figure 5:
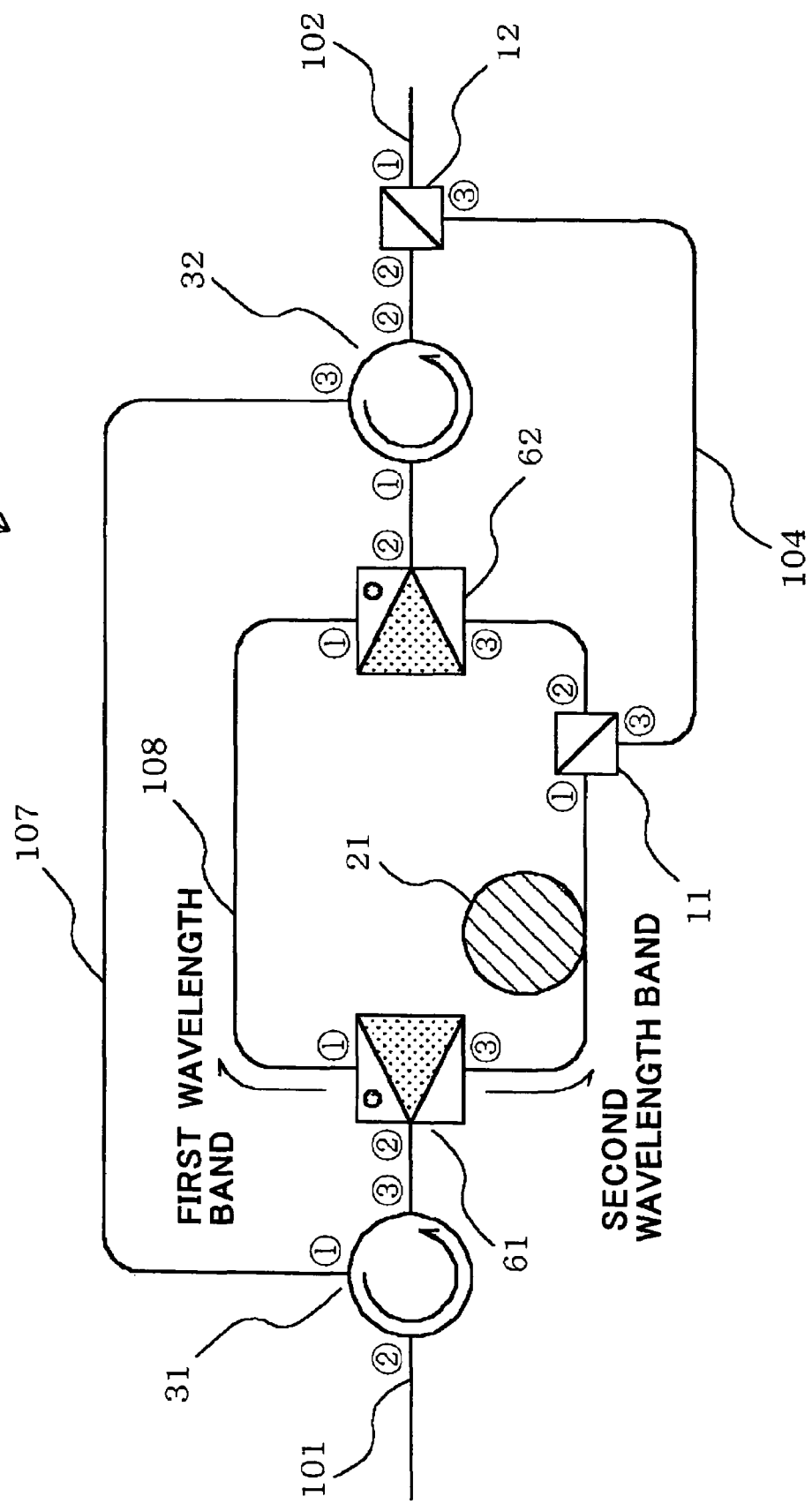
FIG. 5 is a block diagram of a module for amplifying a signal light with a remote excitation-light, in accordance with the fourth embodiment of the present invention.

FIG. 5 is a block diagram of a module 204 for amplifying a signal light with a remote excitation-light, in accordance with the fourth embodiment of the present invention.

The module 204 corresponds in structure to a combination of the module 201 illustrated in FIG. 2 and the module 202 illustrated in FIG. 3, and hence, has functions corresponding to a combination of the function of the module 201 and the function of the module 202.

Specifically, the module 204 is comprised of a first optical input/output line 101 through which a signal light is transmitted, a second optical input/output line 102 through which a signal light is transmitted, an optical amplifier 21 which amplifies a signal light on receipt of an excitation light transmitted from an excitation-light source (not illustrated) through the second optical input/output line 102, a first bypass circuit 107 optically connected to later mentioned first and second optical 3-port circulators 31 and 32 to allow a signal light to bypass the optical amplifier 21, a first optical 3-port circulator 31 having first, second and third ports, and optically connecting the first optical input/output line 101 to both a later mentioned a third filter 61 and the first bypass circuit 107, a second optical 3-port circulator 32 having first, second and third ports, and optically connecting the second optical input/output line 102 to both a later mentioned fourth filter 62 and the first bypass circuit 107, a first filter 11 for synthesizing a signal light and an excitation light to each other and separating a signal light and an excitation light from each other, arranged in an optical transmission line between the optical amplifier 21 and a later mentioned fourth filter 62, a second filter 12 for synthesizing a signal light and an excitation light to each other and separating a signal light and an excitation light from each other, arranged in an optical transmission line between the excitation-light source (not illustrated) and the second optical 3-port circulator 32, a second bypass circuit 104 optically connecting the first and second filters 11 and 12 therethrough for allowing an excitation light to bypass both the second optical 3-port circulator 32 and a later mentioned fourth filter 62, a third filter 61 optically connected to the first optical 3-port circulator 31, the optical amplifier 21, and a later mentioned third bypass circuit 108, a fourth filter 62 optically connected to the second optical 3-port circulator 32, the first filter 11, and a later mentioned third bypass circuit 108, and a third bypass circuit 108 optically connected to both the third and fourth filters 61 and 62.

Parts or elements that correspond to those of the modules 201 and 202 illustrated in FIGS. 2 and 3 have been provided with the same reference numerals, and operate in the same manner as corresponding parts or elements in the modules 201 and 202, unless explicitly explained hereinbelow.

The first optical 3-port circulator 31 is optically connected at its second port ② to the first optical input/output line 101, at its third port ③ to the third filter 61, and at its first port ① to the first bypass circuit 107.

The second optical 3-port circulator 32 is optically connected at its second port ② to the second optical input/output line 102, at its third port ③ to the first bypass circuit 107, and at its first port ① to the fourth filter 62.

The third filter 61 is optically connected at its second port ② to the first optical 3-port circulator 31, at its third port ③ to the optical amplifier 21, and at its first port ① to the third bypass circuit 108.

The fourth filter 62 is optically connected at its second port ② to the second optical 3-port circulator 32, at its third port ③ to the optical amplifier 21 through the first filter 11, and at its first port ① to the third bypass circuit 108.

A first signal light input through the first optical input/output line 101 is introduced into the third filter 61 through the first optical 3-port circulator 31. The first signal light is separated in the first optical 3-port circulator 31 into a signal light having a first wavelength band and a signal light having a second wavelength band.

The signal light having a first wavelength band is output to the second optical input/output line 102 through the third bypass circuit 108, the fourth filter 62, the second optical 3-port circulator 32, and the second filter 12.

The signal light having a second wavelength band is introduced into and amplified in the optical amplifier 21. Then, the signal light having a second wavelength band is output to the second optical input/output line 102 through the first filter 11, the fourth filter 62, the second optical 3-port circulator 32, and the second filter 12.

An excitation light used for causing the optical amplifier 21 to amplify the signal light having a second wavelength band is transmitted to the optical amplifier 21 from an excitation-light source (not illustrated) through the second optical input/output line 102, the second filter 12, the second bypass circuit 104, and the first filter 11.

An excitation light is separated from a second signal light input through the second optical input/output line 102, by means of the second filter 12, and then, is output to the first optical input/output line 101 through the second optical 3-port circulator 32, the first bypass circuit 107, and the first optical 3-port circulator 31.

[Fifth Embodiment]

A module having a function symmetrical with the function of the module 204 illustrated in FIG. 5 may be more effectively used than the module 204. In such a module, a light having a first wavelength band is transmitted in a fixed direction, whereas a light having a second wavelength band is transmitted in opposite directions. Such a module is explained hereinbelow as a module 205 in accordance with the fifth embodiment.

Figure 6:
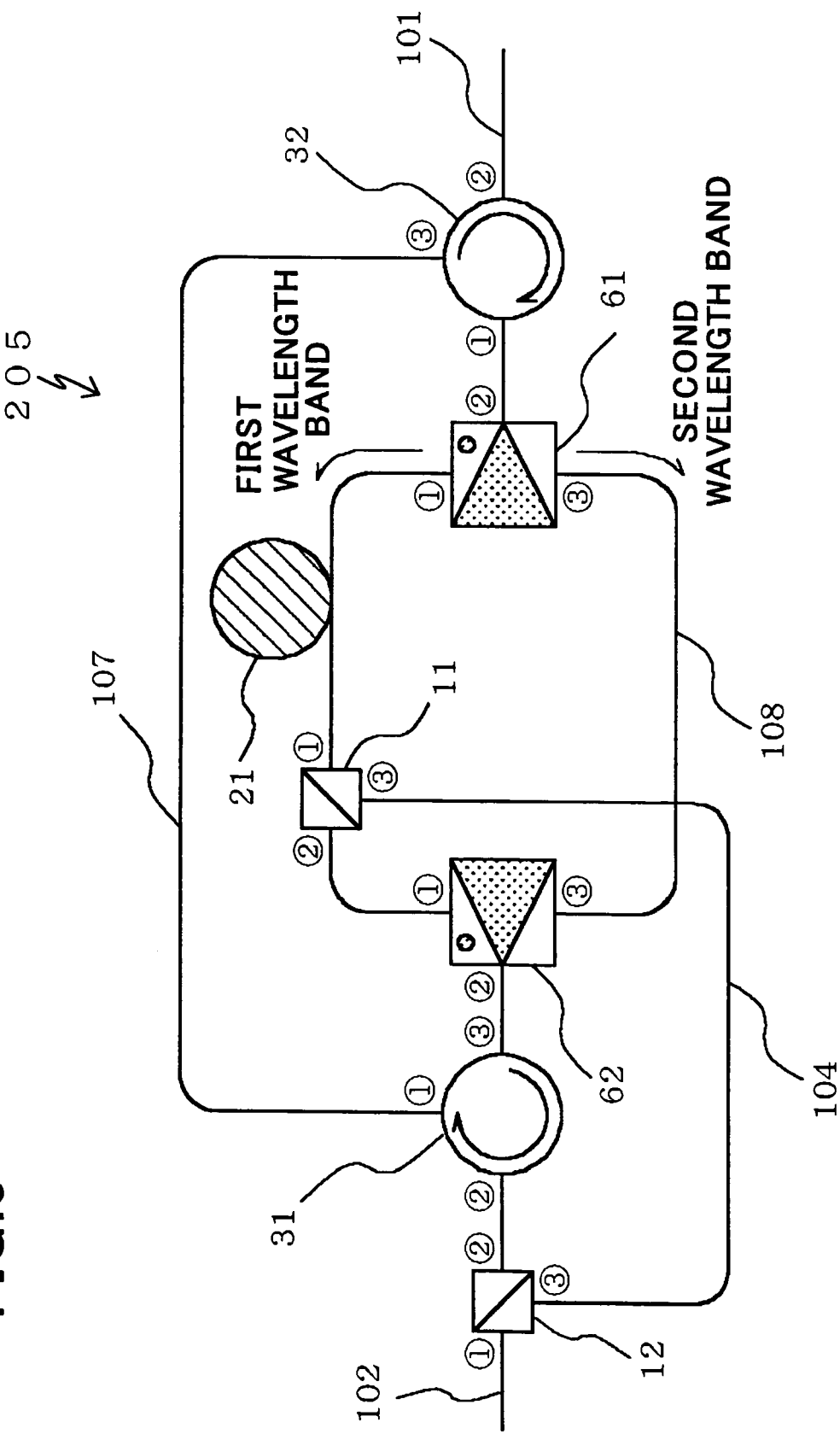
FIG. 6 is a block diagram of a module for amplifying a signal light with a remote excitation-light, in accordance with the fifth embodiment of the present invention.

FIG. 6 is a block diagram of a module 205 for amplifying a signal light with a remote excitation-light, in accordance with the fifth embodiment of the present invention.

The module 205 corresponds in structure to a combination of the module 201 illustrated in FIG. 2 and the module 203 illustrated in FIG. 4, and hence, has functions corresponding to a combination of the function of the module 201 and the function of the module 203.

Specifically, the module 205 is comprised of a first optical input/output line 101 through which a signal light is transmitted, a second optical input/output line 102 through which a signal light is transmitted, an optical amplifier 21 which amplifies a signal light on receipt of an excitation light transmitted from an excitation-light source (not illustrated) through the second optical input/output line 102, a first bypass circuit 107 optically connected to later mentioned first and second optical 3-port circulators 31 and 32 to allow a signal light to bypass the optical amplifier 21, a first optical 3-port circulator 31 having first, second and third ports, and optically connecting the second optical input/output line 102 to both a later mentioned a fourth filter 62 and the first bypass circuit 107, a second optical 3-port circulator 32 having first, second and third ports, and optically connecting the first optical input/output line 101 to both a later mentioned a third filter 61 and the first bypass circuit 107, a first filter 11 for synthesizing a signal light and an excitation light to each other and separating a signal light and an excitation light from each other, arranged in an optical transmission line between the optical amplifier 21 and a later mentioned fourth filter 62, a second filter 12 for synthesizing a signal light and an excitation light to each other and separating a signal light and an excitation light from each other, arranged in an optical transmission line between the excitation-light source (not illustrated) and the first optical 3-port circulator 31, a second bypass circuit 104 optically connecting the first and second filters 11 and 12 therethrough for allowing an excitation light to bypass both the first optical 3-port circulator 31 and a later mentioned fourth filter 62, a third filter 61 optically connected to the second optical 3-port circulator 32, the optical amplifier 21, and a later mentioned third bypass circuit 108, a fourth filter 62 optically connected to the first optical 3-port circulator 31, the first filter 11, and a later mentioned third bypass circuit 108, and a third bypass circuit 108 optically connected to both the third and fourth filters 61 and 62.

Parts or elements that correspond to those of the modules 201 and 203 illustrated in FIGS. 2 and 4 have been provided with the same reference numerals, and operate in the same manner as corresponding parts or elements in the modules 201 and 203, unless explicitly explained hereinbelow.

The first optical 3-port circulator 31 is optically connected at its second port ② to the second optical input/output line 102, at its third port ③ to the fourth filter 62, and at its first port ① to the first bypass circuit 107.

The second optical 3-port circulator 32 is optically connected at its second port ② to the first optical input/output line 101, at its third port ③ to the first bypass circuit 107, and at its first port ① to the third filter 61.

The third filter 61 is optically connected at its second port ② to the second optical 3-port circulator 32, at its third port ③ to the third bypass circuit 108, and at its first port ① to the optical amplifier 21.

The fourth filter 62 is optically connected at its second port ② to the first optical 3-port circulator 31, at its third port ③ to the third bypass circuit 108, and at its first port ① to the optical amplifier 21 through the first filter 11.

The first optical 3-port circulator 31 operates as follows. As indicated with an arrow, a signal light input through the second port ② is output through the first port ①, a signal light input through the third port ③ is output through the second port ②, and a signal light input through the first port ① is not output through any ports. The second optical 3-port circulator 32 operates in the same way as the first optical 3-port circulator 31.

Among signal lights input through the first optical input/output line 101, only a signal light having a first wavelength band is amplified in the optical amplifier 21, and a signal light having a second wavelength band bypasses the optical amplifier 21, and hence, is not amplified in the optical amplifier 21.

The module 205 is structurally different from the module 204 illustrated in FIG. 5 in the arrangement of the second and third ports ② and ③ in the third and fourth filters 61 and 62. However, an optical amplifier for amplifying a signal light having a first wavelength band may be different in a kind and/or a length from an optical amplifier for amplifying a signal light having a second wavelength band. Hence, it is necessary to optimize those optical amplifiers.

[Sixth Embodiment]

Figure 7:
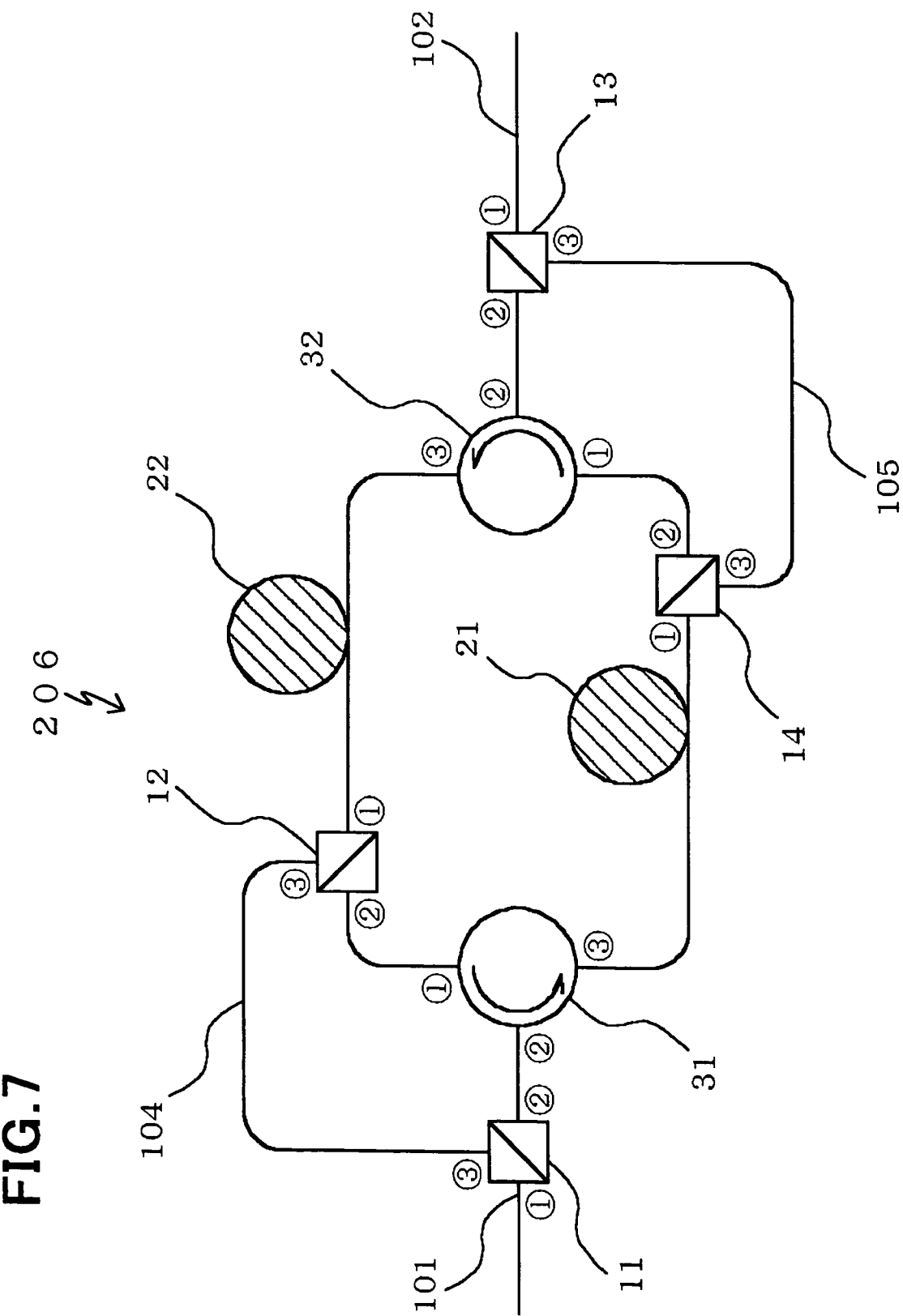
FIG. 7 is a block diagram of a module for amplifying a signal light with a remote excitation-light, in accordance with the sixth embodiment of the present invention.

FIG. 7 is a block diagram of a module 206 for amplifying a signal light with a remote excitation-light, in accordance with the sixth embodiment of the present invention.

The module 206 is comprised of a first optical input/output line 101 through which a signal light is transmitted, a second optical input/output line 102 through which a signal light is transmitted, a first optical amplifier 21 which amplifies a signal light on receipt of an excitation light transmitted from an excitation-light source (not illustrated) through the second optical input/output line 102, a second optical amplifier 22 which amplifies a signal light on receipt of an excitation light transmitted from an excitation-light source (not illustrated) through the first optical input/output line 101, a first optical connector 31 which optically connects the first optical input/output line 101 to the first optical amplifier 21, and further optically connects the first optical input/output line 101 to the second optical amplifier 22 through a later mentioned second filter 12, a second optical connector 32 which optically connects the second optical input/output line 102 to the first optical amplifier 21 through a later mentioned fourth filter 14, and further optically connects the second optical input/output line 102 to the second optical amplifier 107, a first filter 11 for synthesizing a signal light and an excitation light to each other and separating a signal light and an excitation light from each other, arranged in the first optical input/output line 101, a second filter 12 for synthesizing a signal light and an excitation light to each other and separating a signal light and an excitation light from each other, arranged in an optical transmission line between the second optical amplifier 22 and the first optical connector 31, a first bypass circuit 104 optically connecting the first and second filters 11 and 12 therethrough for allowing an excitation light to bypass the first optical connector 31, a third filter 13 for synthesizing a signal light and an excitation light to each other and separating a signal light and an excitation light from each other, arranged in the second optical input/output line 102, a fourth filter 14 for synthesizing a signal light and an excitation light to each other and separating a signal light and an excitation light from each other, arranged in an optical transmission line between the first optical amplifier 21 and the second optical connector 32, and a second bypass circuit 105 optically connecting the third and fourth filters 13 and 14 therethrough for allowing an excitation light to bypass the second optical connector 32.

Each of the first and second optical amplifiers 21 and 22 includes optical fibers to which rare earth element is doped.

The first optical connector 31 is comprised of a first optical 3-port circulator having first, second and third ports, and the second optical connector 32 is comprised of a second optical 3-port circulator having first, second and third ports.

The first optical 3-port circulator 31 operates as follows. As indicated with an arrow, a signal light input through the second port ② is output through the third port ③, a signal light input through the first port ① is output through the second port ②, and a signal light input through the third port ③ is not output through any ports. The second optical 3-port circulator 32 operates in the same way as the first optical 3-port circulator 31.

The first optical 3-port circulator 31 is optically connected at its second port ② to the first optical input/output line 101, at its third port ③ to the first optical amplifier 21, and at its first port ① to the second optical amplifier 22 through the second filter 12.

The second optical 3-port circulator 32 is optically connected at its second port ② to the second optical input/output line 102, at its third port ③ to the second optical amplifier 22, and at its first port ① to the first optical amplifier 21 through the fourth filter 14.

Whereas the module 201 illustrated in FIG. 2 is designed to be able to amplify only a signal light transmitting in a single direction, specifically, a signal light to be input through the first optical input/output line 101, the module 206 illustrated in FIG. 7 is designed to be able to amplify signal lights transmitting in opposite directions.

A signal light input through the first optical input/output line 101 is transmitted to the first optical amplifier 21 through the first filter 11 and the first optical 3-port circulator 31.

An excitation light used for exciting the first optical amplifier 21 is transmitted to the first optical amplifier 21 from an excitation-light source (not illustrated) through the second optical input/output line 102, the third filter 13, the second bypass circuit 105, and the fourth filter 14.

A signal light having been amplified in the first optical amplifier 21 is output to the second optical input/output line 102 through the fourth filter 14, the second optical 3-port circulator 32, and the third filter 13.

A signal light input through the second optical input/output line 102, the signal is transmitted to the second optical amplifier 22 through the third filter 13 and the second optical 3-port circulator 32.

An excitation light used for exciting the second optical amplifier 22 is transmitted to the second optical amplifier 22 from an excitation-light source (not illustrated) through the first optical input/output line 101, the first filter 11, the first bypass circuit 104, and the second filter 12.

A signal light having been amplified in the second optical amplifier 22 is output to the first optical input/output line 101 through the second filter 12, the first optical 3-port circulator 31, and the first filter 11.

[Seventh Embodiment]

Figure 8:
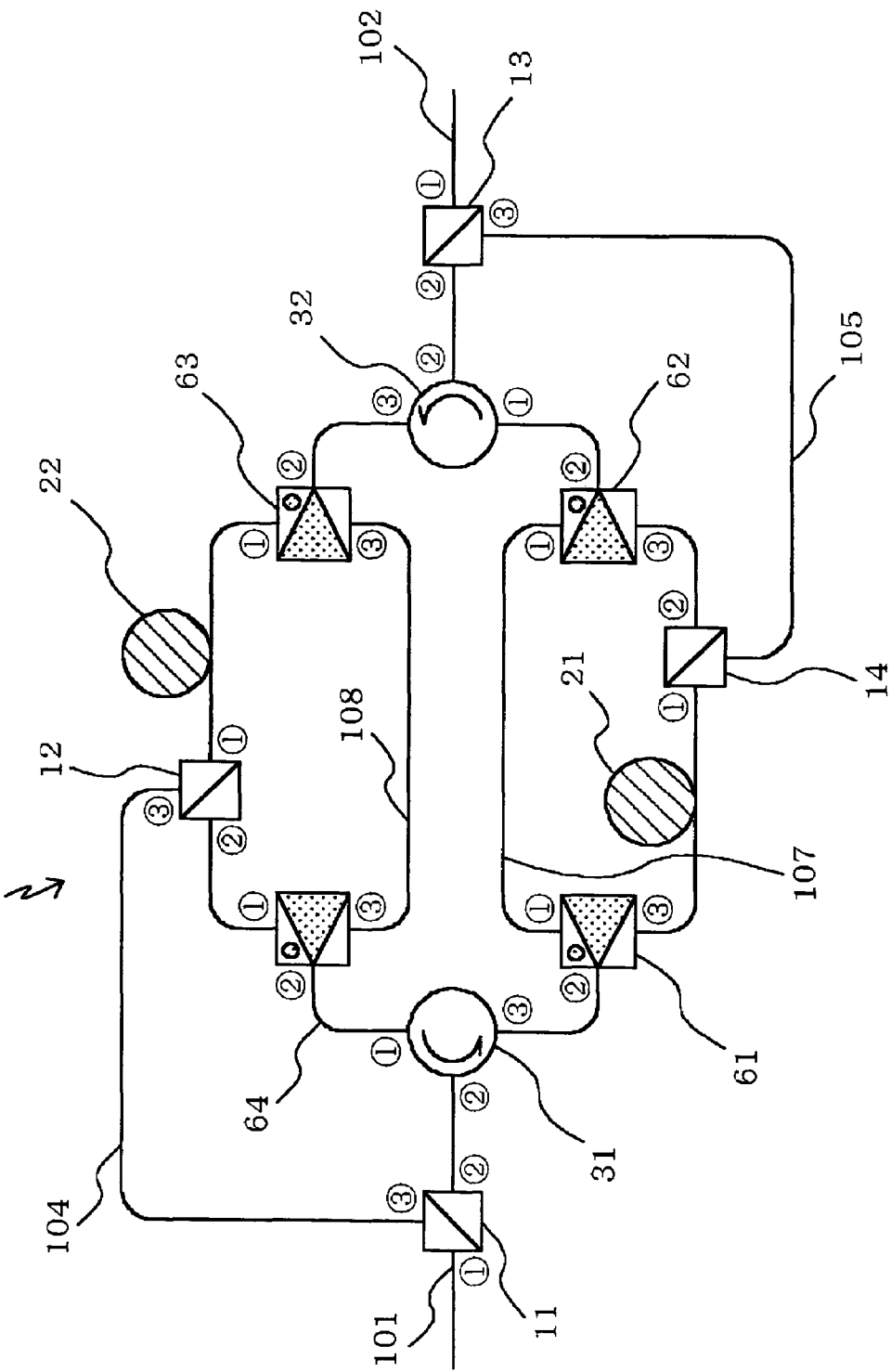
FIG. 8 is a block diagram of a module for amplifying a signal light with a remote excitation-light, in accordance with the seventh embodiment of the present invention.

FIG. 8 is a block diagram of a module 207 for amplifying a signal light with a remote excitation-light, in accordance with the seventh embodiment of the present invention.

The module 207 illustrated in FIG. 8 corresponds to a combination of the module 206 illustrated in FIG. 7, the module 202 illustrated in FIG. 3, and the module 203 illustrated in FIG. 4.

In comparison with the module 206 illustrated in FIG. 7, the module 207 further includes a fifth filter 61, a sixth filter 62, a seventh filter 63, and an eighth filter 64, a third bypass circuit 107, and a fourth bypass circuit 108.

Each of the fifth to eighth filters 61 to 64 synthesizes a signal light and an excitation light to each other, and separates a signal light and an excitation light from each other.

Parts or elements that correspond to those of the modules 202, 203 and 206 illustrated in FIGS. 3, 4 and 7 have been provided with the same reference numerals, and operate in the same manner as corresponding parts or elements in the modules 202, 203 and 206, unless explicitly explained hereinbelow.

The first optical 3-port circulator 31 is optically connected at its second port ② to the first optical input/output line 101, at its third port ③ to the fifth filter 61, and at its first port ① to the eighth filter 64.

The second optical 3-port circulator 32 is optically connected at its second port ② to the second optical input/output line 102, at its third port ③ to the seventh filter 63, and at its first port ① to the sixth filter 62.

The fifth filter 61 is optically connected to the first optical 3-port circulator 31, the first optical amplifier 21, and the third bypass circuit 107.

The sixth filter 62 is optically connected to the second optical 3-port circulator 32, the first optical amplifier 21 through the fourth filter 14, and the third bypass circuit 107.

The seventh filter 63 is optically connected to the second optical 3-port circulator 32, the second optical amplifier 22, and the fourth bypass circuit 108.

The eighth filter 64 is optically connected to the first optical 3-port circulator 31, the second optical amplifier 22 through the second filter 12, and the fourth bypass circuit 108.

The first optical amplifier 21 is arranged in an optical transmission line between the fifth and sixth filters 61 and 62. The second optical amplifier 22 is arranged in an optical transmission line between the seventh and eighth filters 63 and 64.

The second filter 12 is arranged in an optical transmission line between the second optical amplifier 22 and the eighth filter 64.

The fourth filter 14 is arranged in an optical transmission line between the first optical amplifier 21 and the sixth filter 64.

A signal light input through the first optical input/output line 101 is transmitted to the fifth filter 61 through the first filter 11 and the first optical 3-port circulator 31. The signal light is separated in the fifth filter 61 into a signal light having a first wavelength band and a signal light having a second wavelength band. The signal light having a first wavelength band is transmitted to the sixth filter 62 through the third bypass circuit 107. The signal light having a second wavelength band is transmitted to the sixth filter 62 through the first optical amplifier 21 and the fourth filter 14.

An excitation light used for exciting the first optical amplifier 21 is transmitted to the first optical amplifier 21 from an excitation-light source (not illustrated) through the second optical input/output line 102, the third filter 13, the second bypass circuit 105, and the fourth filter 14.

The signal light having a first wavelength band and the signal light having a second wavelength band are output to the second optical input/output line 102 from the sixth filter 62 through the second optical 3-port circulator 32 and the third filter 13.

A signal light input through the second optical input/output line 102 is transmitted to the seventh filter 63 through the third filter 13 and the second optical 3-port circulator 32. The signal light is separated in the seventh filter 63 into a signal light having a first wavelength band and a signal light having a second wavelength band. The signal light having a second wavelength band is transmitted to the eighth filter 64 through the fourth bypass circuit 108. The signal light having a first wavelength band is transmitted to the eighth filter 64 through the second optical amplifier 22 and the second filter 12.

An excitation light used for exciting the second optical amplifier 22 is transmitted to the second optical amplifier 22 from an excitation-light source (not illustrated) through the first optical input/output line 101, the first filter 11, the first bypass circuit 104, and the second filter 12.

The signal light having a first wavelength band and the signal light having a second wavelength band are output to the first optical input/output line 101 from the eighth filter 64 through the first optical 3-port circulator 31 and the first filter 11.

In the modules 201 to 207 illustrated in FIGS. 2 to 8, backward excitation occurs in the optical amplifier 21 or 22 comprised of optical fibers to which rare earth elements are doped, that is, a signal light and an excitation light transmit in opposite directions in the optical amplifier 21 or 22. However, it should be noted that forward excitation in which a signal light and an excitation light transmit in a common direction may be applied to the optical amplifier 21 or 22. Selection of forward excitation or backward excitation is dependent on which is considered more important between noise performance and saturation output of an optical amplifier. If noise performance is considered more important than saturation output, forward excitation is selected, and if saturation output is considered more important than noise performance, backward excitation is selected.

[Eighth Embodiment]

Figure 9:
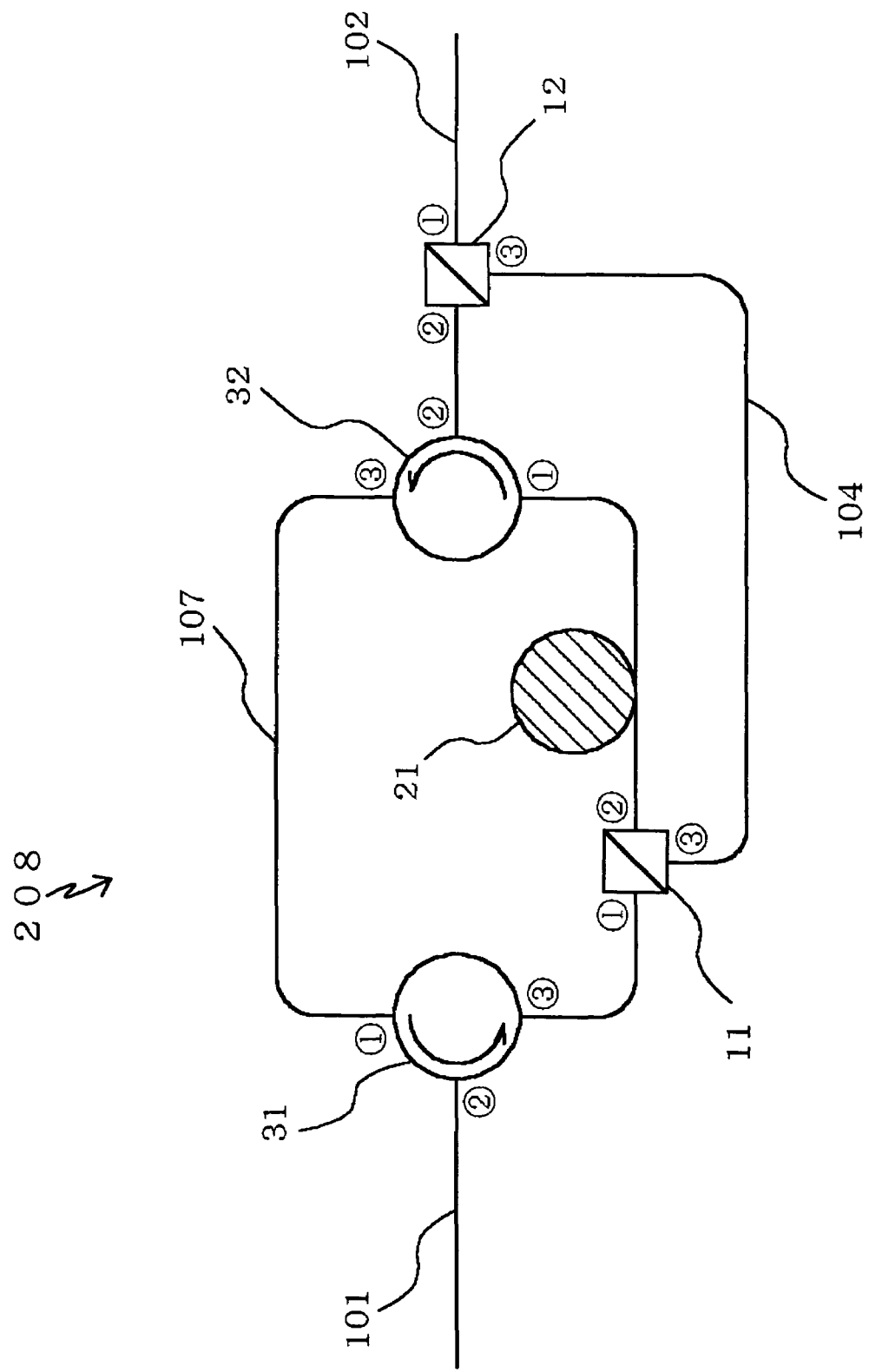
FIG. 9 is a block diagram of a module for amplifying a signal light with a remote excitation-light, in accordance with the eighth embodiment of the present invention.

FIG. 9 is a block diagram of a module 208 for amplifying a signal light with a remote excitation-light, in accordance with the eighth embodiment of the present invention.

Whereas the module 201 illustrated in FIG. 2 is of backward-excitation type, the module 208 illustrated in FIG. 9 is of forward-excitation type.

The module 208 is structurally different from the module 201 in that the optical fiber 21 is located between the first filter 11 and the second optical 3-port circulator 3, whereas the optical fiber 21 is located between the first filter 11 and the first optical 3-port circulator 31 in the module 201.

Parts or elements that correspond to those of the module 201 illustrated in FIG. 2 have been provided with the same reference numerals, and operate in the same manner as corresponding parts or elements in the module 201, unless explicitly explained hereinbelow.

Forward-excitation may be applied to the modules 202 to 207 illustrated in FIGS. 3 to 8.

The modules 201 to 208 may be designed to have not only a function of amplification, but also other functions. The most preferable function to additionally apply to the modules 201 to 208 is a function of compensating for scattering. Compensation for scattering in a module for amplifying a signal light with a remote excitation-light provides advantages of simplification of a structure of a relay unit, and improvement in transmission characteristic of a high-rate signal such as a signal having a transmission rate of 40 Gb/s.

[Ninth Embodiment]

Figure 10:
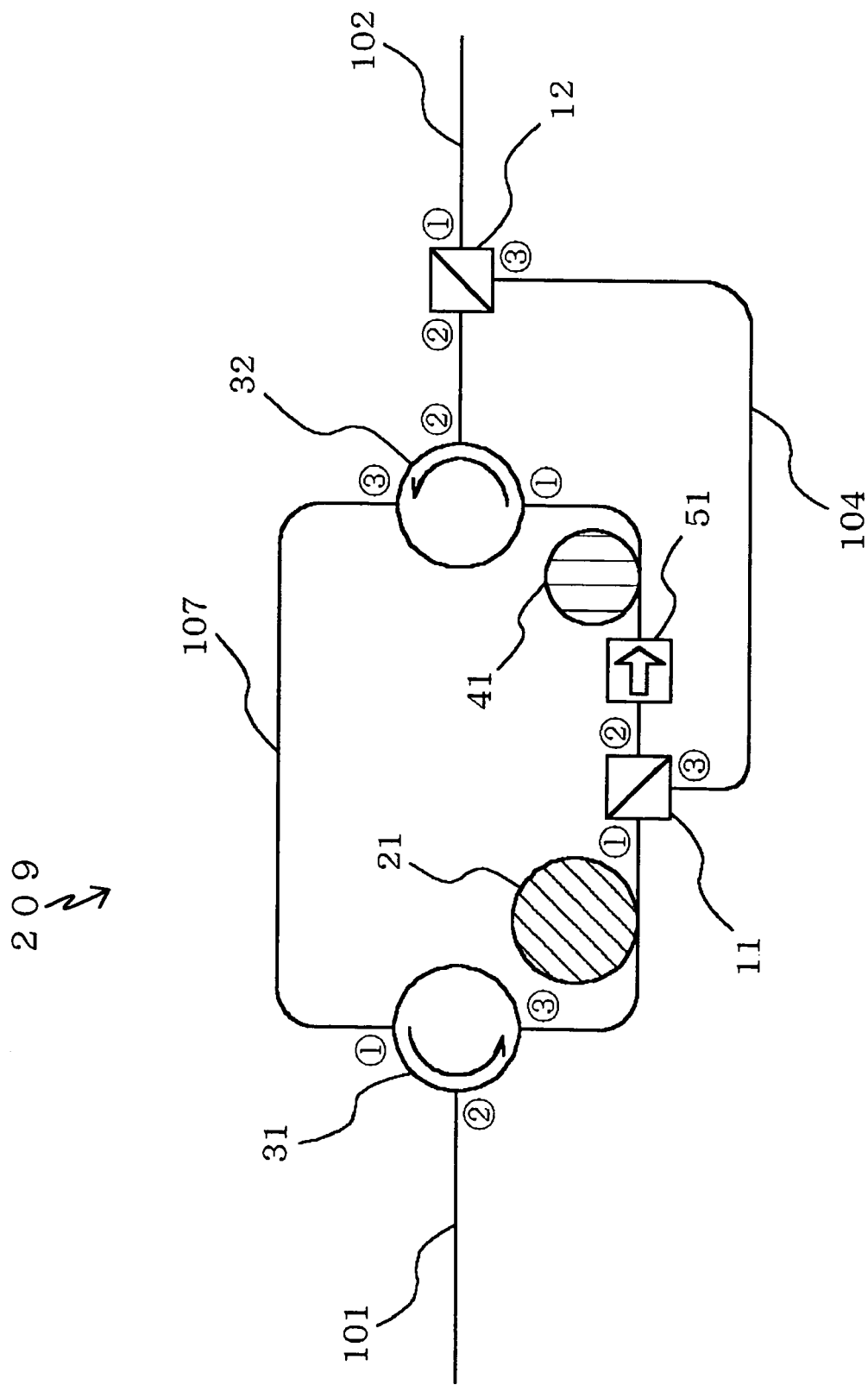
FIG. 10 is a block diagram of a module for amplifying a signal light with a remote excitation-light, in accordance with the ninth embodiment of the present invention.

FIG. 10 is a block diagram of a module 209 for amplifying a signal light with a remote excitation-light, in accordance with the ninth embodiment of the present invention.

In comparison with the module 201 illustrated in FIG. 2, the module 209 is designed to have a function of compensating for scattering, as well as a function of amplification. Specifically, the module 209 is structurally different from the module 201 in additionally including a device 41 for compensating for scattering, and an isolator 51, both arranged between the first filter 11 and the second optical 3-port circulator 32.

The device 41 for compensating for scattering may be positioned upstream or downstream of the optical amplifier 21. The device 41 is usually designed to have high non-linearity. Hence, since the device 41 cannot receive a signal light having a high signal-intensity, it is preferable to position the device 41 upstream of the optical amplifier 21. However, since the motivation of amplification of a signal light with a remote excitation-light is improvement in an optical SNR, optical loss caused upstream of the optical amplifier 21 has to be minimized. Accordingly, as illustrated in FIG. 10, the device 41 is positioned downstream of the optical amplifier 21 in the module 209. Specifically, the device 41 and the isolator 51 are arranged between the first filter 11 and the second optical 3-port circulator 32.

Compensation for wavelength-scattering provided by the device 41 is preferably equal to a total of wavelength-scattering accumulated in the span. However, assuming that a span is comprised of standard single mode fibers (SSMFs) of 160 kilometers, wavelength-scattering to be compensated for is about 2700 ps/nm, and a loss in the device 41 which is capable of compensating for about 2700 ps/nm is quite high, specifically, about 14 dB. If a loss in the device 41 arranged downstream of the optical amplifier 21 is higher than a gain obtained by the optical amplifier 21, improvement in an optical SNR is reduced in comparison with no amplification of a signal light with a remote excitation-light. Accordingly, it is preferable to determine compensation for wavelength-scattering, obtained by the device 41, by making much of a smaller one among the following two factors:

First factor: Wavelength-scattering accumulated in the span; and

Second factor: Optical loss equal to or smaller than a gain obtained by amplification of a signal light with a remote excitation-light.

[Tenth Embodiment]

In the modules 201 and 204 illustrated in FIGS. 2 and 5, the first and second optical 3-port circulators 31 and 32 are optically directly connected to each other through the bypass circuit 107. The first and second optical 3-port circulators 31 and 32 and the bypass circuit 107 may be replaced with a single optical 4-port circulator, as explained hereinbelow as the tenth embodiment.

Figure 11:
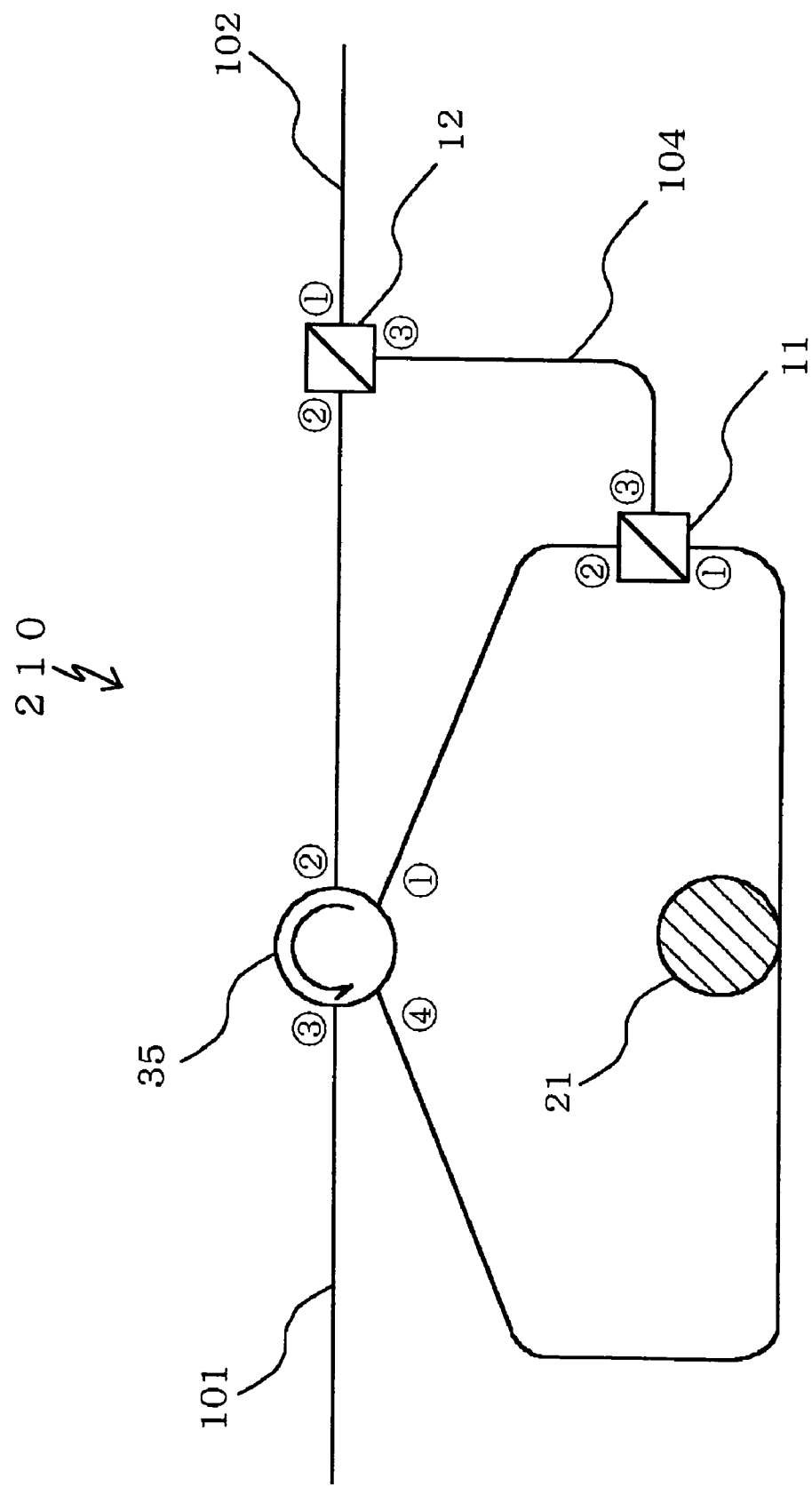
FIG. 11 is a block diagram of a module for amplifying a signal light with a remote excitation-light, in accordance with the tenth embodiment of the present invention.

FIG. 11 is a block diagram of a module 210 for amplifying a signal light with a remote excitation-light, in accordance with the tenth embodiment of the present invention.

The module 210 illustrated in FIG. 11 is structurally different from the module 201 illustrated in FIG. 2 in that the first and second optical 3-port circulators 31 and 32 and the bypass circuit 107 are replaced with a single optical 4-port circulator 35.

The optical 4-port circulator 35 has first, second, third and fourth ports. As indicated with an arrow, a signal light input through the first port ① is output through the second port ②, a signal light input through the second port ② is output through the third port ③, a signal light input through the third port ③ is output through the fourth port ④, and a signal light input through the fourth port ④ is not output through any ports.

Parts or elements that correspond to those of the module 201 illustrated in FIG. 2 have been provided with the same reference numerals, and operate in the same manner as corresponding parts or elements in the module 201, unless explicitly explained hereinbelow.

The module 210 operates in the same way as the module 201 illustrated in FIG. 2, and has the same functions as those of the module 201 illustrated in FIG. 2.

The optical 4-port circulator 35 provides advantages that the number of devices constituting the module can be reduced, and hence, the fabrication and running costs can be reduced, and that the module can be fabricated in a smaller size. On the other hand, a combination of the first and second optical 3-port circulators 31 and 32 and the bypass circuit 107 may be upgraded, for instance, by additionally inserting a level-equalizing device into the bypass circuit 107.

The module 210 is obtained by replacing the first and second optical 3-port circulators 31 and 32 and the bypass circuit 107 with the optical 4-port circulator 35 in the module 201 illustrated in FIG. 2. However, it should be noted that the same replacement can be applied to the modules 204, 208 and 209 illustrated in FIGS. 5, 9 and 10.

The module 208 illustrated in FIG. 9 to which forward-excitation is applied in place of backward-excitation, and the module 209 illustrated in FIG. 10 additionally including the isolator 51 and the device 41 for compensating for wavelength-scattering are both based on the module 201 illustrated in FIG. 2. The replacement and/or addition like this may be applied to the modules 202, 203, 204, 205, 206, 207 and 210 illustrated in FIGS. 3, 4, 5, 6, 7, 8 and 11, respectively.

Hereinbelow are explained optical-fiber communication systems including one or more of the above-mentioned modules 201 to 210.

Figure 12:
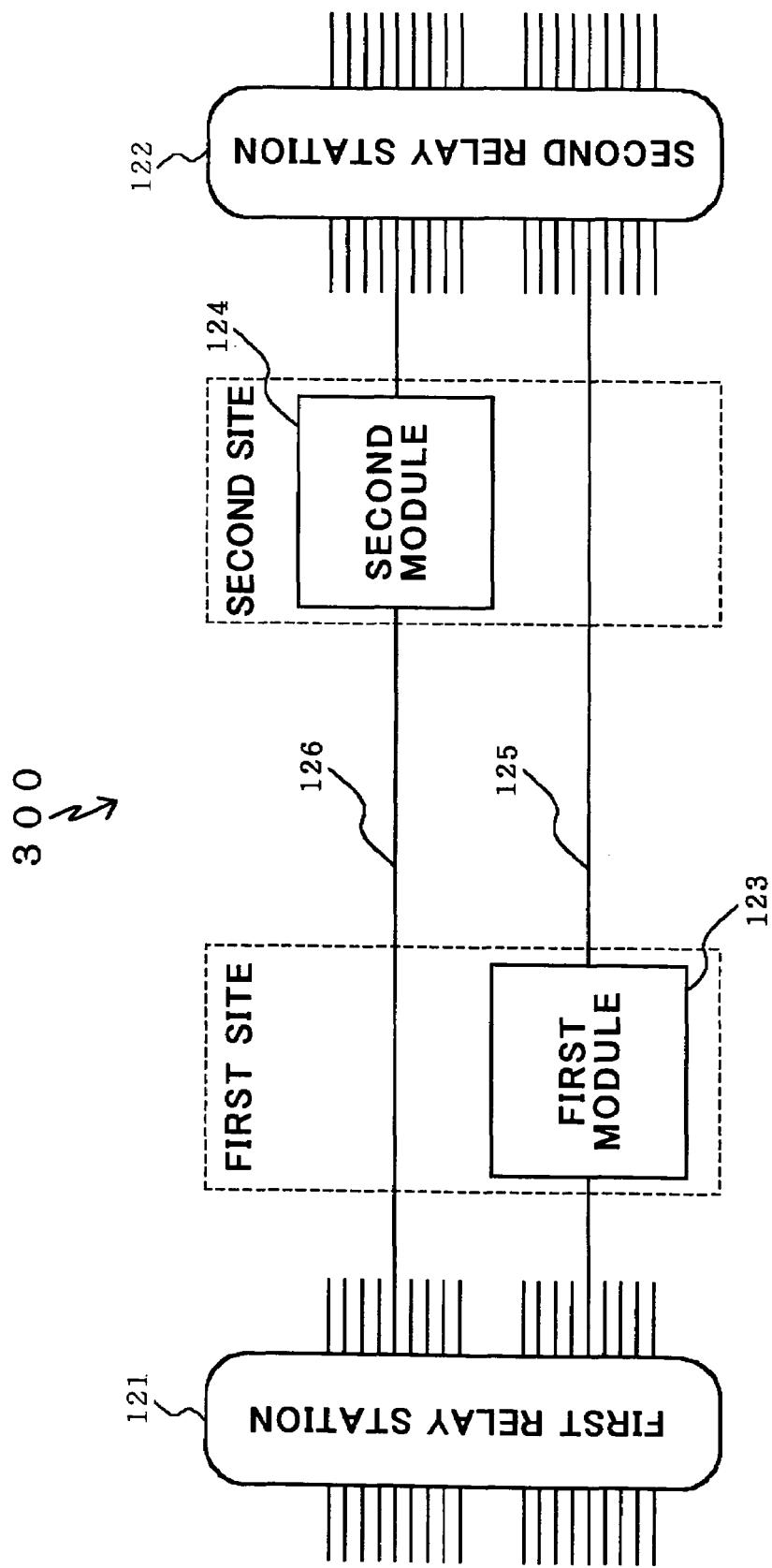
FIG. 12 is a block diagram of an optical-fiber communication system including a module for amplifying a signal light with a remote excitation-light, arranged in an optical transmission line.

FIG. 12 is a block diagram of an optical-fiber communication system 300 including a module for amplifying a signal light with a remote excitation-light, arranged in an optical transmission line.

The optical-fiber communication system 300 is comprised of a first module 123 for amplifying a signal light with a remote excitation-light, placed at a first site, a first optical transmission line 125 optically connecting the first module 123 to a first relay station 121 and a second relay station 122, a second module 124 for amplifying a signal light with a remote excitation-light, placed at a second site, a second optical transmission line 126 optically connecting the second module 124 to the first relay station 121 and the second relay station 122.

A location of a module for amplifying a signal light with a remote excitation-light, specifically, a distance from a relay station has to be within an area to which excitation light can sufficiently reach from a relay station in which an excitation-light source is arranged. Considering an optical loss in a present optical fiber, an intensity of an excitation light transmitted from an excitation-light source, and advantages obtained by the present technique for amplifying a signal light with a remote excitation-light, a distance between a relay station in which an excitation-light source is arranged and a module for amplifying a signal light with a remote excitation-light transmitted from the excitation-light source is in the range of about 30 to about 100 kilometers.

Hence, in order to apply the technique for amplifying a signal light with a remote excitation-light to an optical transmission line between the first and second relay stations 121 and 122, taking up-link and down-link into consideration, it would be necessary to place the modules at two sites.

For a signal light to be transmitted to the first relay station 121 from the second relay station 122, the first module 123 is placed at the first site which is close to the first relay station 121, and an excitation light is supplied to the first module 123 from the first relay station 121. For a signal light to be transmitted to the second relay station 122 from the first relay station 121, the second module 124 is placed at the second site which is close to the second relay station 122, and an excitation light is supplied to the second module 124 from the second relay station 122.

Thus, a signal light is transmitted to the second relay station 122 from the first relay station 121 through the second optical transmission line 126, and a signal light is transmitted to the first relay station 121 from the second relay station 122 through the first optical transmission line 125 in the optical-fiber communication system 300 illustrated in FIG. 12.

Hereinbelow is explained improvements obtained by introducing the above-mentioned modules 201 to 210 into the optical-fiber communication system 300 illustrated in FIG. 12.

[Eleventh Embodiment]

Figure 13:
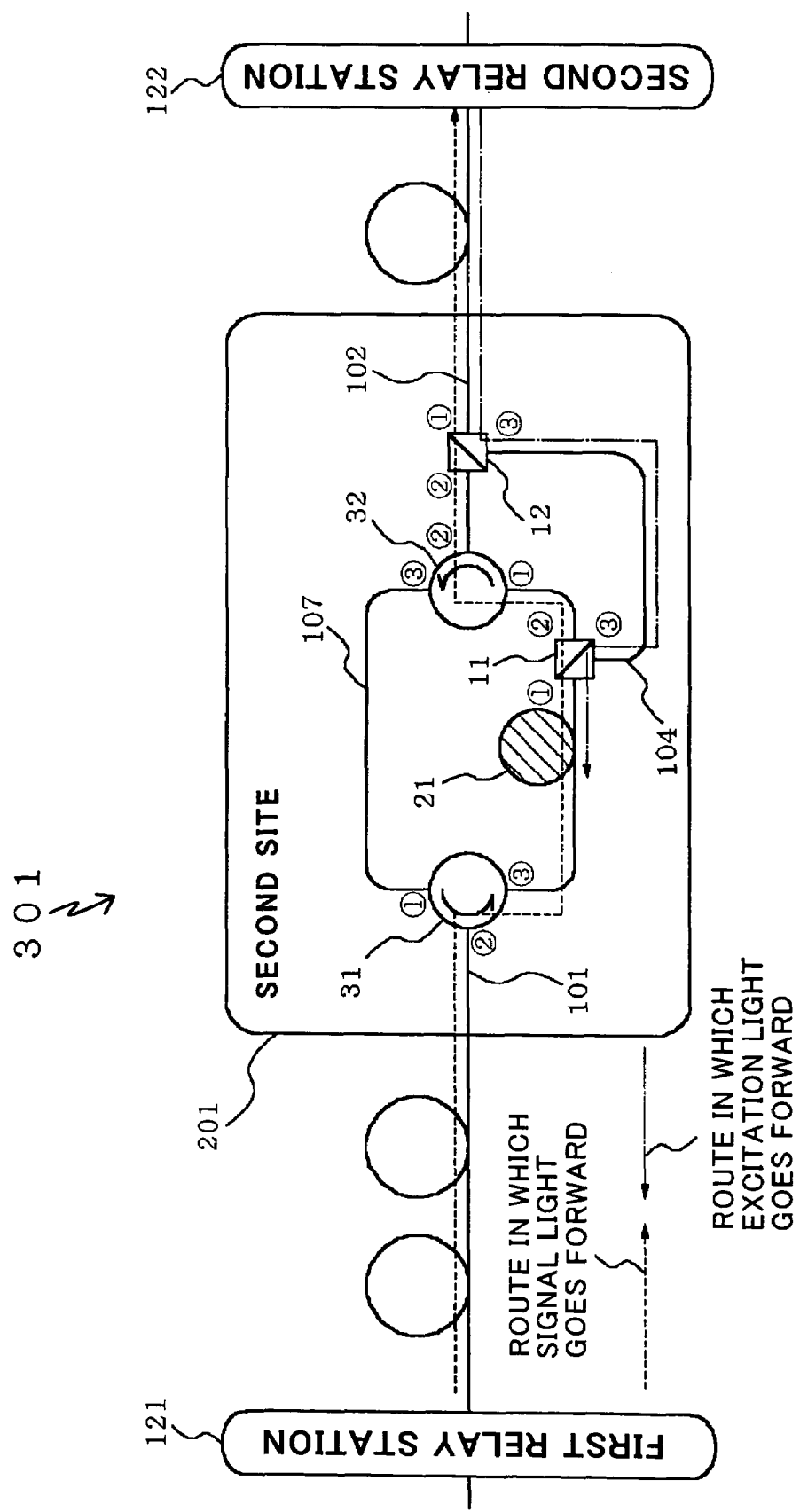
FIG. 13 is a block diagram of an optical-fiber communication system in accordance with the eleventh embodiment of the present invention.
Figure 14:
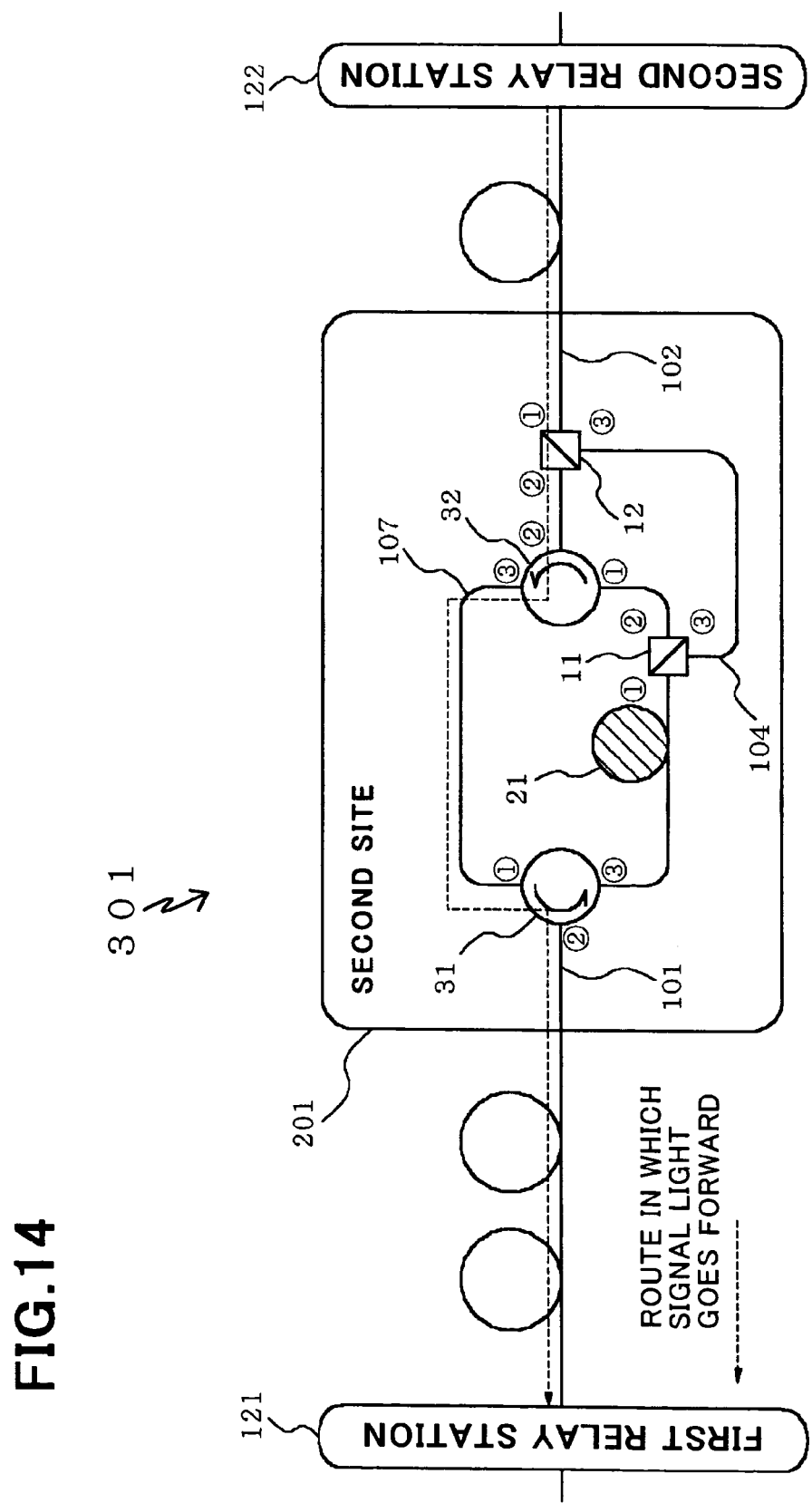
FIG. 14 is a block diagram of an optical-fiber communication system in accordance with the eleventh embodiment of the present invention.

FIGS. 13 and 14 are block diagrams of an optical-fiber communication system 301 in accordance with the eleventh embodiment of the present invention.

The optical-fiber communication system 301 has the same structure as that of the optical-fiber communication system 300 illustrated in FIG. 12, in which the second module 124 is comprised of the module 201 illustrated in FIG. 2. Though each of the first and second optical transmission lines 125 and 126 is illustrated as a single line in FIG. 12, it is assumed that they are comprised of a plurality of optical transmission lines.

When a signal light to be transmitted to the second relay station 122 from the first relay station 121 needs to be amplified, specifically, when high capacity is transmitted through a signal light having a rate of 40 Gb/s, or when a signal light is transmitted in a long distance, a signal light is transmitted through the second optical transmission line 126, and is amplified in the module 201 by introducing an excitation light into the module 201 from the second relay station 122, as illustrated in FIG. 13. Since a signal light directed to the first relay station 121 from the second relay station 122 can bypass the optical amplifier 21, it would be possible to transmit a signal light not necessary to be amplified, to the first relay station 121 from the second relay station 122 by allowing the signal light to go forward through the second optical transmission line 126, as illustrated in FIG. 14.

Similarly, it is possible to transmit a signal light necessary to be amplified, to the first relay station 121 from the second relay station 122 by allowing the signal light to go forward through the first optical transmission line 125, and it is also possible to transmit a signal light not necessary to be amplified, to the second relay station 122 from the first relay station 121 by allowing the signal light to go forward through the first optical transmission line 125.

As mentioned above, the use of two optical transmission lines, namely, the first and second optical transmission lines 125 and 126 makes it possible to transmit a signal light in four ways in dependence on a direction and necessity of amplification of a signal light. Thus, the optical-fiber transmission system 301 has extended flexibility to alternation of a use of optical transmission lines.

[Twelfth Embodiment]

Figure 15:
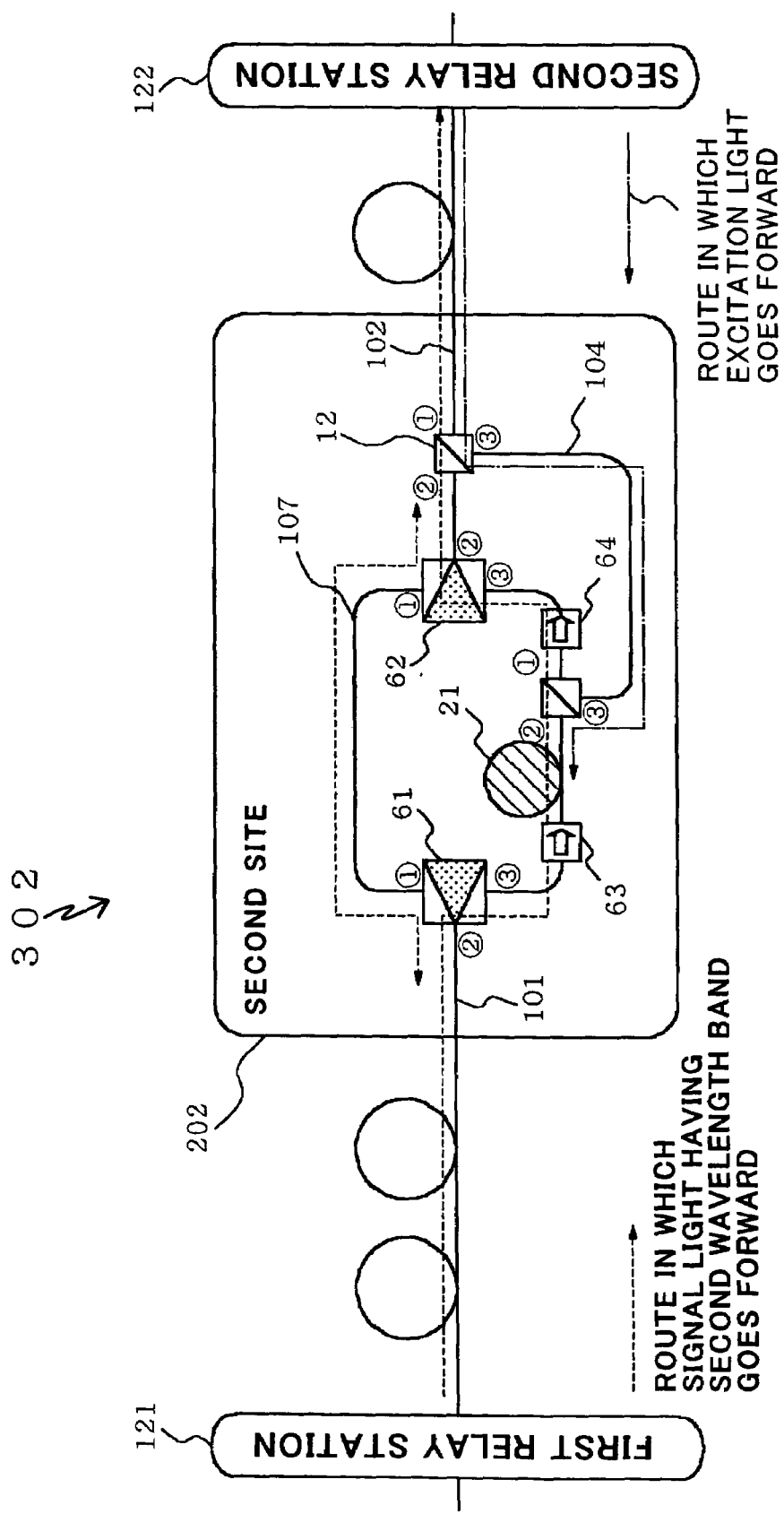
FIG. 15 is a block diagram of an optical-fiber communication system in accordance with the twelfth embodiment of the present invention.

FIG. 15 is a block diagrams of an optical-fiber communication system 302 in accordance with the twelfth embodiment of the present invention.

The optical-fiber communication system 302 has the same structure as that of the optical-fiber communication system 300 illustrated in FIG. 12, in which the second module 124 is comprised of the module 202 illustrated in FIG. 3.

The optical-fiber communication system 302 operates in two ways.

In the first way, when a signal light is transmitted to the second relay station 122 from the first relay station 121, a second wavelength band is selected as a signal wavelength band for amplifying the signal light, if the amplification is necessary to be carried out for high-capacity transmission or long-range transmission, and a first wavelength band is selected, if the amplification is not necessary to be carried out. Both first and second wavelength bands may be concurrently used. For instance, if bit-rate channels in a broad range coexist, channels at 10 Gb/s or higher may be applied to a second wavelength band, and channels at 10 Gb/s or smaller may be applied to a first wavelength band.

In the second way, signal lights are transmitted in a single fiber in opposite directions. This is useful particularly when a traffic in a direction to the second relay station 122 from the first relay station 121 and a traffic in a direction to the first relay station 121 from the second relay station 122 are asymmetrical with each other. For instance, such asymmetry is found in an optical transmission line between a big city and a small city.

Hereinbelow is explained the second way in detail, assuming that a traffic in a direction to the second relay station 122 from the first relay station 121 is necessary to be greater than a traffic in a direction to the first relay station 121 from the second relay station 122.

A second wavelength band is applied to a signal light to be transmitted to the second relay station 122 from the first relay station 121, and the amplification of the signal light is carried out in the second optical transmission line 126. A first wavelength band is applied to a signal light to be transmitted to the first relay station 121 from the second relay station 122, and the amplification of the signal light is carried out in the second optical transmission line 126.

A case where a signal light to be transmitted to the first relay station 121 from the second relay station 122 is necessary to be amplified in an optical-fiber system in which a signal light is transmitted in a single fiber in opposite directions is explained later.

Figure 16:
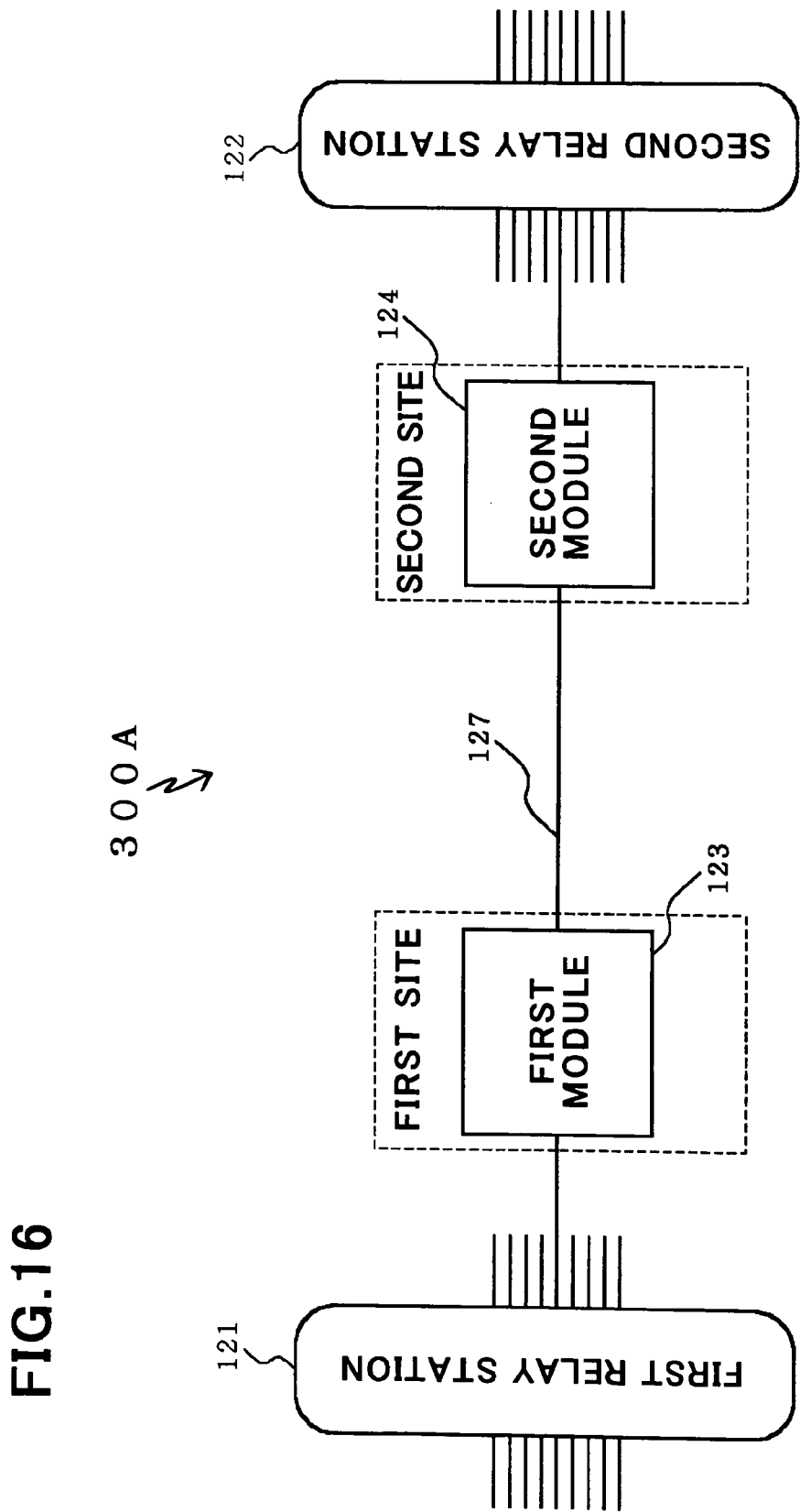
FIG. 16 is a block diagram of an optical-fiber communication system including two modules each for amplifying a signal light with a remote excitation-light, arranged in an optical transmission line.

FIG. 16 is a block diagram of an optical-fiber communication system 300A including two modules for amplifying a signal light with a remote excitation-light, arranged in an optical transmission line.

The optical-fiber communication system 300A is comprised of a first module 123 for amplifying a signal light with a remote excitation-light, placed at a first site, a second module 124 for amplifying a signal light with a remote excitation-light, placed at a second site, and an optical transmission line 127 optically connecting the first module 123 to both the first relay station 121 and the second module 124, and further optically connecting the second module 124 to both the second relay station 122 and the first module 123.

The optical-fiber communication system 300A is designed to include the two modules 123 and 124 in an optical transmission line unlike the optical-fiber communication system 300 illustrated in FIG. 12. The optical-fiber communication system 300A is characterized in that signal lights transmitted in opposite directions can be amplified, and that the optical-fiber communication system 300A has only one line in which a signal light can be amplified, whereas the optical-fiber communication system 300 has two lines in which a signal light can be amplified. The optical-fiber communication system 300A provides advantages of ultimate flexibility in functions of an optical transmission line, and further of simplification of construction of the system 300A due to only one optical transmission line.

Functions presented by the optical-fiber communication system 300A are dependent on a structure of a module to be used in the optical-fiber communication system 300A. For instance, when the module 201 is used in the optical-fiber communication system 300A, signal lights transmitted in opposite directions can be amplified with an excitation light, but actual amplification is carried out to a signal light transmitted in one of the directions. When the module 202 is used in the optical-fiber communication system 300A, signal lights transmitted in opposite directions can be amplified with an excitation light, and actual amplification can be carried out to signal lights transmitted in the opposite directions.

[Thirteenth Embodiment]

Figure 17:
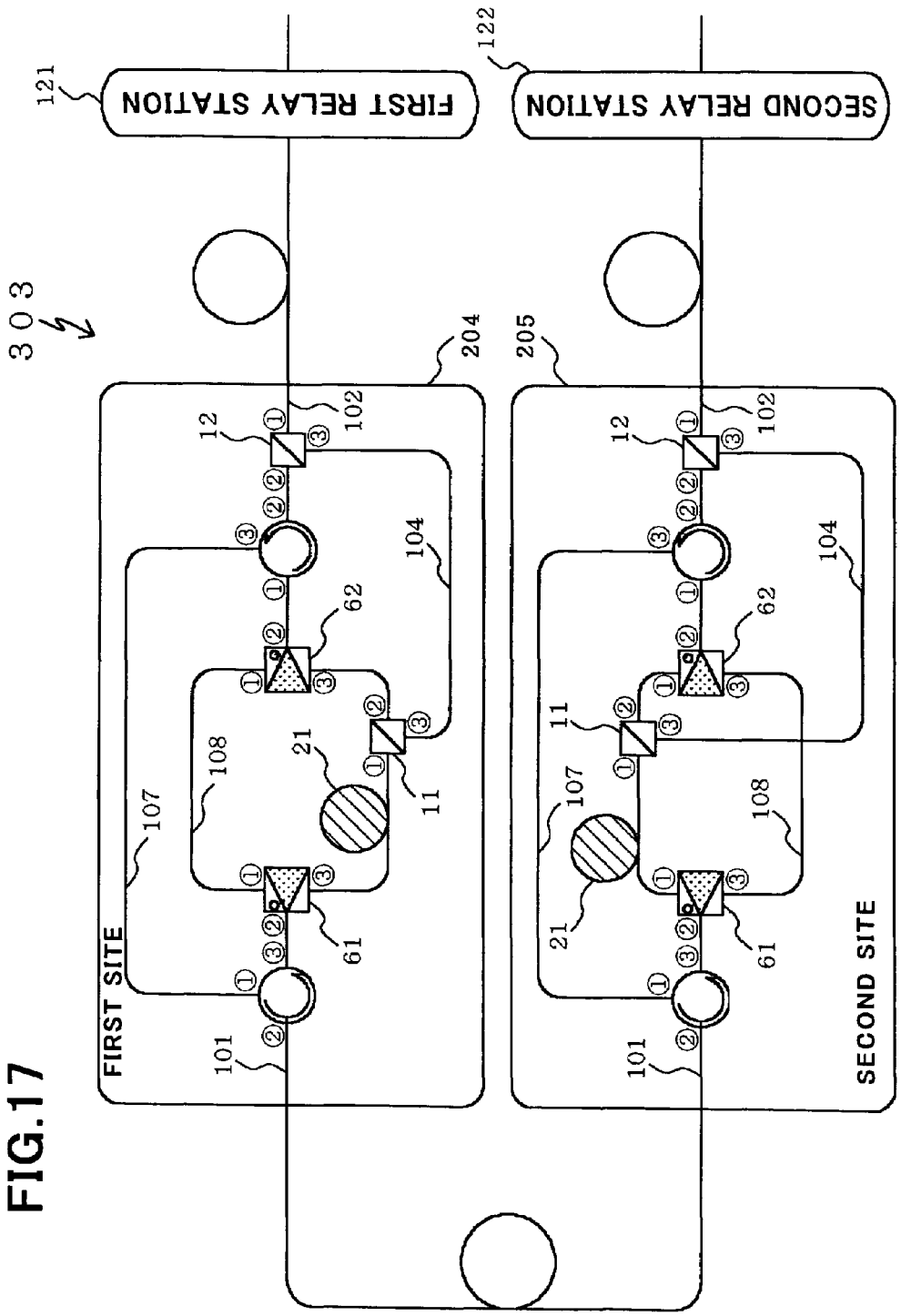
FIG. 17 is a block diagram of an optical-fiber communication system in accordance with the thirteenth embodiment of the present invention.
Figure 18:
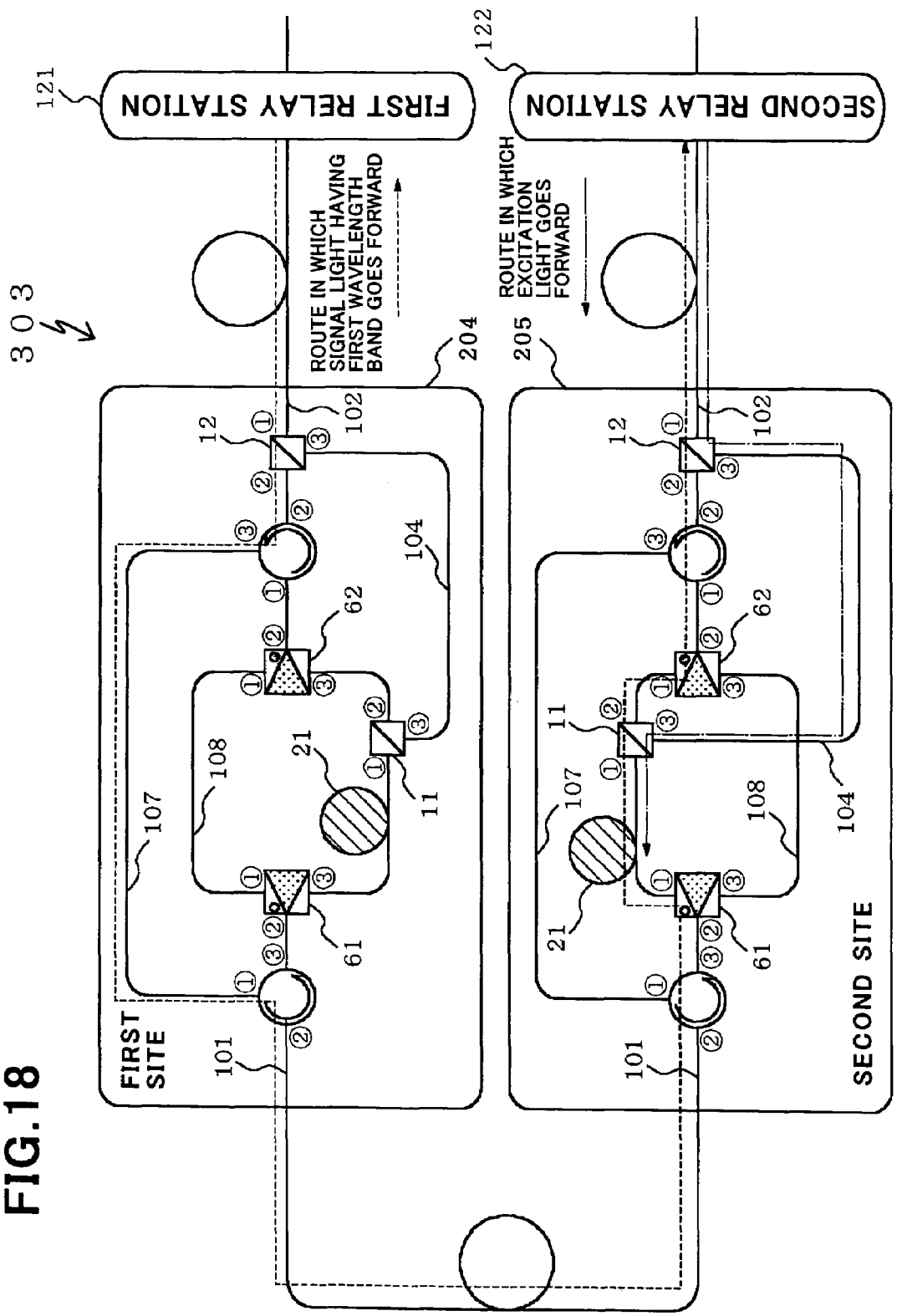
FIG. 18 is a block diagram of an optical-fiber communication system in accordance with the thirteenth embodiment of the present invention.

FIGS. 17 and 18 are block diagrams of an optical-fiber communication system 303 in accordance with the thirteenth embodiment of the present invention.

The optical-fiber communication system 303 has the same structure as that of the optical-fiber communication system 300A illustrated in FIG. 16, in which the first module 123 is comprised of the module 204 illustrated in FIG. 5 and the second module 124 is comprised of the module 205 illustrated in FIG. 6.

As is obvious in view of FIGS. 5 and 6, the modules 204 and 205 are symmetrical in structure with each other.

Signal lights can be transmitted in the following four ways in the optical-fiber communication system 303. One or more of the following four signal lights can be transmitted in a common fiber, if they do not have a common signal wavelength.

(A) A signal light to be transmitted to the second relay station 122 from the first relay station 121, and to be amplified with an excitation light. The signal light has a wavelength within a first wavelength band.

(B) A signal light to be transmitted to the second relay station 122 from the first relay station 121, and not to be amplified with an excitation light. The signal light has a wavelength within a second wavelength band.

(C) A signal light to be transmitted to the first relay station 121 from the second relay station 122, and to be amplified with an excitation light. The signal light has a wavelength within a second wavelength band.

(D) A signal light to be transmitted to the first relay station 121 from the second relay station 122, and not to be amplified with an excitation light. The signal light has a wavelength within a first wavelength band.

FIG. 18 indicates a route in which a signal light is transmitted and a route in which an excitation light is transmitted in the above-mentioned case (A).

A signal light is designed to have a wavelength within a first wavelength band so as to be amplified in the second site. With reference to FIG. 18, a signal light leaving the first relay station 121 passes through the first bypass circuit 107 in the first module 123 comprised of the module 204. Then, the signal light is amplified in the second module 124 comprised of the module 205, with an excitation light transmitted from the second relay station 122.

In FIG. 16, the first site may be identical to the second site, in which case, the first optical input/output lines 101 in the first and second modules 123 and 124 may be directly optically connected to each other.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-075870 filed on Mar. 19, 2003 including specification, claims, drawings and summary is incorporated herein by reference in its entirety.

What is claimed is:

1. A module for amplifying a signal light with a remote excitation-light, comprising:
   (a) a first optical input/output line through which a signal light is transmitted;
   (b) a second optical input/output line through which a signal light is transmitted;
   (c) an optical amplifier which amplifies a signal light on receipt of an excitation light transmitted through said first or second optical input/output line;
   (d) a bypass circuit which allows said signal light to bypass said optical amplifier;
   (e) a first optical connector which optically connects said first optical input/output line to said optical amplifier, and further optically connects said first optical input/output line to said bypass circuit; and
   (f) a second optical connector which optically connects said second optical input/output line to said optical amplifier, and further optically connects said second optical input/output line to said bypass circuit,
   wherein said first optical connector is comprised of a first optical 3-port circulator having first, second and third ports wherein a signal light input through said second port is output through said third port, a signal light input through said first port is output through said second port, and a signal light input through said third port is not output through any ports,
   said second optical connector is comprised of a second optical 3-port circulator having first, second and third ports wherein a signal light input through said second port is output through said third port, a signal light input through said first port is output through said second port, and a signal light input through said third port is not output through any ports,
   said first optical 3-port circulator is optically connected at its second port to said first optical input/output line, at its third port to said optical amplifier, and at its first port to said bypass circuit, and
   said second optical 3-port circulator is optically connected at its second port to said second optical input/output line, at its third port to said bypass circuit, and at its first port to said optical amplifier.

2. A module for amplifying a signal light with a remote excitation-light, comprising:
   (a) a first optical input/output line through which a signal light is transmitted;
   (b) a second optical input/output line through which a signal light is transmitted;
   (c) an optical amplifier which amplifies a signal light on receipt of an excitation light transmitted through said first or second optical input/output line;
   (d) a bypass circuit which allows said signal light to bypass said optical amplifier;
   (e) a first optical connector which optically connects said first optical input/output line to said optical amplifier, and further optically connects said first optical input/output line to said bypass circuit; and
   (f) a second optical connector which optically connects said second optical input/output line to said optical amplifier, and further optically connects said second optical input/output line to said bypass circuit,
   wherein said first optical connector is comprised of a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output, said second optical connector is comprised of a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output, said first optical filter is optically connected at its second port to said first optical input/output line, at its third port to said optical amplifier, and at its first port to said bypass circuit, and said second optical filter is optically connected at its second port to said second optical input/output line, at its third port to said optical amplifier, and at its first port to said bypass circuit.

3. A module for amplifying a signal light with a remote excitation-light, comprising:

(a) a first optical input/output line through which a signal light is transmitted;

(b) a second optical input/output line through which a signal light is transmitted;

(c) an optical amplifier which amplifies a signal light on receipt of an excitation light transmitted through said first or second optical input/output line;

(d) a bypass circuit which allows said signal light to bypass said optical amplifier;

(e) a first optical connector which optically connects said first optical input/output line to said optical amplifier, and further optically connects said first optical input/output line to said bypass circuit; and (f) a second optical connector which optically connects said second optical input/output line to said optical amplifier, and further optically connects said second optical input/output line to said bypass circuit, wherein said first optical connector is comprised of a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output, said second optical connector is comprised of a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output, said first optical filter is optically connected at its second port to said first optical input/output line, at its third port to said bypass circuit, and at its first port to said optical amplifier, and said second optical filter is optically connected at its second port to said second optical input/output line, at its third port to said bypass circuit, and at its first port to said optical amplifier.

4. The module as set forth in claim 1, wherein said bypass circuit has a same component structure as said optical amplifier.

5. A module for amplifying a signal light with a remote excitation-light, comprising:

(a) a first optical input/output line through which a signal light is transmitted;

(b) a second optical input/output line through which a signal light is transmitted;

(c) an optical amplifier which amplifies a signal light on receipt of an excitation light transmitted through said first or second optical input/output line;

(d) a bypass circuit which allows said signal light to bypass said optical amplifier;

(e) a first optical connector which optically connects said first optical input/output line to said optical amplifier, and further optically connects said first optical input/Output line to said bypass circuit;

(f) a second optical connector which optically connects said second optical input/output line to said optical amplifier, and further optically connects said second optical input/output line to said bypass circuit; and an optical 4-port circulator, wherein said first optical connector, said second optical connector and said bypass circuit are optically connected to said optical 4-port circulator having first, second, third and fourth ports wherein a signal light input through said third port is output through said fourth port, a signal light input through said first port is output through said second port, a signal light input through said second port is output through said third port, and a signal light input through said fourth port is not output through any ports, and said optical 4-port circular is optically connected at its third port to said first optical input/output line, at its fourth port to said optical amplifier at one end thereof, at its first port to said optical amplifier at the other end thereof, and at its second port to said second optical input/output line, and wherein optical signals amplified by said optical amplifier are capable of being sent to either said first port of said 4-port circulator or said second optical input/output line.

6. The module as set forth in claim 1, wherein said optical amplifier includes optically amplifying medium comprised of an optical fiber into which rare earth element is doped.

7. The module as set forth in claim 1, wherein said excitation light to be transmitted to said optical amplifier is one of a forward excitation light and a backward excitation light.

8. The module as set forth in claim 1, further comprising at least one optical isolator, and at least one device for compensating for optical dispersion, both arranged between said optical amplifier and at least one of said first and second optical connectors.

9. A module for amplifying a signal light with a remote excitation-light, comprising:

(a) a first optical input/output line through which a signal light is transmitted;

(b) a second optical input/output line through which a signal light is transmitted;

(c) a first optical 3-port circulator having first, second and third ports wherein a signal light input through said second port is output through said third port, a signal light input through said first port is output through said second port, and a signal light input through said third port is not output through any ports;

(d) a second optical 3-port circulator having first, second and third ports wherein a signal light input through said second port is output through said third port, a signal light input through said first port is output through said second port, and a signal light input through said third port is not output through any ports;

(e) an optical amplifier which amplifies a signal light on receipt of an excitation light transmitted through said first or second optical input/output line;

(f) a first bypass circuit which allows said signal light to bypass said optical amplifier;

(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;

(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and (i) a second bypass circuit which allows said signal light to bypass said optical amplifier, wherein said first optical 3-port circulator is optically connected at its second port to said first optical input/output line, at its third port to said first optical filter, and at its first port to said first bypass circuit, said second optical 3-port circulator is optically connected at its second port to said second optical input/output line, at its third port to said first bypass circuit, and at its first port to said second optical filter, said first optical filter is optically connected at its second port to said first optical 3-port circulator, at its third port to said optical amplifier, and at its first port to said second bypass circuit, and said second optical filter is optically connected at its second port to said second optical 3-port calculator, at its third port to said optical amplifier, and at its first port to said second bypass circuit.

10. The module as set forth in claim 9, wherein said optical amplifier includes optically amplifying medium comprised of an optical fiber into which rare earth element is doped.

11. The module as set forth in claim 9, wherein said excitation light to be transmitted to said optical amplifier is one of a forward excitation light and a backward excitation light.

12. The module as set forth in claim 9, further comprising at least one optical isolator, and at least one device for compensating for optical dispersion, both arranged between said optical amplifier and at least one of said first and second optical filters.

13. A module for amplifying a signal light with a remote excitation-light, comprising:

(a) a first optical input/output line through which a signal light is transmitted;

(b) second optical input/output line through which a signal light is transmitted;

(c) a first optical 3-port circulator having first, second and third ports wherein a signal light input through said second port is output through said third port, a signal light input through said first port is output through said second port, and a signal light input through said third port is not output through any ports;

(d) a second optical 3-port circulator having first, second and third ports wherein a signal light input through said second port is output through said third port, a signal light input through said first port is output through said second port, and a signal light input through said third port is not output through any ports;

(e) an optical amplifier which amplifies a signal light on receipt of an excitation light transmitted through said first or second optical input/output line;

(f) a first bypass circuit which allows said signal light to bypass said optical amplifier;

(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;

(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and (i) a second bypass circuit which allows said signal light to bypass said optical amplifier, wherein said first optical 3-port circulator is optically connected at its second port to said first optical input/output line, at its third port to said first optical filter, and at its first port to said first bypass circuit, said second optical 3-port circulator is optically connected at its second port to said second optical input/output line, at its third port to said first bypass circuit, and at its first port to said second optical filter, said first optical filter is optically connected at its second port to said first optical 3-port circulator, at its first port to said optical amplifier, and at its third port to said second bypass circuit, and said second optical filter is optically connected at its second port to said second optical 3-port calculator, at its first port to said optical amplifier, and at its third port to said second bypass circuit.

14. The module as set forth in claim 13, wherein said optical amplifier includes optically amplifying medium comprised of an optical fiber in which rare earth element is doped.

15. The module as set forth in claim 13, wherein said excitation light to be transmitted to said optical amplifier is one of a forward excitation light and a backward excitation light.

16. The module as set forth in claim 13, further comprising at least one optical isolator, and at least one device for compensating for optical dispersion, both arranged between said optical amplifier and at least one of said first and second optical filters.

17. A module for amplifying a signal light with a remote excitation-light, comprising:
(a) a first optical input/output line through which a signal light is transmitted;
(b) a second optical input/output line through which a signal light is transmitted;
(c) a first optical 3-port circulator having first, second and third ports wherein a signal light input through said second port is output through said third port, a signal light input through said first port is output through said second port, and a signal light input through said third port is not output through any ports;
(d) a second optical 3-port circulator having first, second and third ports wherein a signal light input through said second port is output through said third port, a signal light input through said first port is output through said second port, and a signal light input through said third port is not output through any ports;
(e) a first optical amplifier which amplifies a signal light on receipt of an excitation light transmitted through said first or second optical input/output line;
(f) a first bypass circuit which allows said signal light to bypass said first optical amplifier;
(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;
(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output,
(i) a second optical amplifier which amplifies a signal light on receipt of an excitation light transmitted through said first or second optical input/output line;
(j) a second bypass circuit which allows said signal light to bypass said second optical amplifier;
(k) a third optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and
(l) a fourth optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output,
wherein said first optical 3-port circulator is optically connected at its second port to said first optical input/output line, at its third port to said first optical filter, and at its first port to said fourth optical filter,
said second optical 3-port circulator is optically connected at its second port to said second optical input/output line, at its third port to said third optical filter, and at its first port to said second optical filter,
said first optical filter is optically connected at its second port to said first optical 3-port circulator, at its third port to said first optical amplifier, and at its first port to said first bypass circuit, and
said second optical filter is optically connected at its second port to said second optical 3-port circulator, at its third port to said third optical filter, and at its first port to said first bypass filter,
said third optical filter is optically connected at its second port to said second optical 3-port circulator, at its first port to said second optical amplifier, and at its third port to said second bypass circuit, and
said fourth optical filter is optically connected at its second port to said first optical 3-port calculator, at its first port to said second optical amplifier, and at its third port to said second bypass circuit.

18. The module as set forth in claim 17, wherein said optical amplifier includes optically amplifying medium comprised of an optical fiber into which rare earth element is doped.

19. The module as set forth in claim 17, wherein said excitation light to be transmitted to said optical amplifier is one of a forward excitation light and a backward excitation light.

20. The module as set forth in claim 17, further comprising at least one optical isolator, and at least one device for compensating for optical dispersion, both arranged between said first optical amplifier and at least one of said first and second optical connectors and/or between said second optical amplifier and at least one of said third and fourth optical connectors.

21. A module for amplifying a signal light with a remote excitation-light, comprising:
(a) a first optical input/output line through which a signal light is transmitted;
(b) a second optical input/output line through which a signal light is transmitted;
(c) a first optical 3-port circulator having first, second and third ports wherein a signal light input through said second port is output through said first port, a signal light input through said third port is output through said second port, and a signal light input through said first port is not output through any ports;
(d) a second optical 3-port circulator having first, second and third ports wherein a signal light input through said second port is output through said first port, a signal light input through said third port is output through said second port, and a signal light input through said first port is not output through any ports;
(e) an optical amplifier which amplifies a signal light on receipt of an excitation light transmitted through said first or second optical input/output line;
(f) a first bypass circuit which allows said signal light to bypass said optical amplifier;
(g) a first optical filter having first, second and third ports wherein said second port is a port through which a signal light comprised of a signal light having a first wavelength band and a signal light having a second wavelength band, combined to each other, is input and output, said first port is a port through which a signal light having said first wavelength band is input and output, and said third port is a port through which a signal light having said second wavelength band is input and output;
(h) a second optical filter having first, second and third ports wherein said second port is a port through which a signal light comprised of a signal light having a first wavelength band and a signal light having a second wavelength band, combined to each other, is input and output, said first port is a port through which a signal light having said first wavelength band is input and output, and said third port is a port through which a signal light having said second wavelength band is input and output; and
(i) a second bypass circuit which allows said signal light to bypass said optical amplifier,
wherein said first optical 3-port circulator is optically connected at its second port to said second optical input/output line, at its third port to said second optical filter, and at its first port to said first bypass circuit,
said second optical 3-port circulator is optically connected at its second port to said first optical input/output line, at its third port to said first bypass circuit, and at its first port to said first optical filter,
said first optical filter is optically connected at its second port to said second optical 3-port circulator, at its third port to said second bypass circuit, and at its first port to said optical amplifier, and
said second optical filter is optically connected at its second port to said first optical 3-port calculator, at its third port to said second bypass circuit, and at its first port to said optical amplifier.

22. A module for amplifying a signal light with a remote excitation-light, comprising:
(a) a first optical input/output line through which a signal light is transmitted;
(b) a second optical input/output line through which a signal light is transmitted;
(c) a first optical amplifier which amplifies a signal light on receipt of an excitation light transmitted through said first or second optical input/output line;
(d) a second optical amplifier which amplifies a signal light on receipt of an excitation light transmitted through said first or second optical input/output line;
(e) a first optical 3-port circulator having first, second and third ports wherein a signal light input through said second port is output through said third port, a signal light input through said first port is output through said second port, and a signal light input through said third port is not output through any ports; and
(f) a second optical 3-port circulator having first, second and third ports wherein a signal light input through said second port is output through said third port, a signal light input through said first port is output through said second port, and a signal light input through said third port is not output through any ports,
said first optical 3-port circulator is optically connected at its second port to said first optical input/output line, at its third port to said first optical amplifier, and at its first port to said second optical amplifier, and
said second optical 3-port circulator is optically connected at its second port to said second optical input/output line, at its third port to said second optical amplifier, and at its first port to said first optical amplifier.

23. An optical-fiber communication system allowing first and second sites to make optical communication therebetween, comprising:
(a) at least one module for amplifying a signal light with a remote excitation-light;
(b) a first optical fiber optically connecting said module to said first site; and
(c) a second optical fiber optically connecting said module to said second site,
said module comprising:
(a) a first optical input/output line through which a signal light is transmitted;
(b) a second optical input/output line through which a signal light is transmitted;
(c) an optical amplifier which amplifies a signal light on receipt of an excitation light transmitted through said first or second optical input/output line;
(d) a bypass circuit which allows said signal light to bypass said optical amplifier;
(e) a first optical 3-port circulator having first, second and third ports wherein a signal light input through said second port is output through said third port, a signal light input through said first port is output through said second port, and a signal light input through said third port is not output through any ports; and
(f) a second optical 3-port circulator having first, second and third ports wherein a signal light input through said second port is output through said third port, a signal light input through said first port is output through said second port, and a signal light input through said third port is not output through any ports,
wherein said first optical 3-port circulator is optically connected at its second port to said first optical input/output line, at its third port to said optical amplifier, and at its first port to said bypass circuit,
said second optical 3-port circulator is optically connected at its second port to said second optical input/output line, at its third port to said bypass circuit, and at its first port to said optical amplifier,
said first optical input/output line is optically connected to said first optical fiber, and
said second optical input/output line is optically connected to said second optical fiber.

24. An optical-fiber communication system allowing first and second sites to make optical communication therebetween, comprising:
(a) at least one module for amplifying a signal light with a remote excitation-light;
(b) a first optical fiber optically connecting said module to said first site; and
(c) a second optical fiber optically connecting said module to said second site,
said module comprising:
(a) a first optical input/output line through which a signal light is transmitted;

(b) a second optical input/output line through which a signal light is transmitted;
(c) a first optical 3-port circulator having first, second and third ports wherein a signal light input through said second port is output through said third port, a signal light input through said first port is output through said second port, and a signal light input through said third port is not output through any ports;
(d) a second optical 3-port circulator having first, second and third ports wherein a signal light input through said second port is output through said third port, a signal light input through said first port is output through said second port, and a signal light input through said third port is not output through any ports;
(e) an optical amplifier which amplifies a signal light on receipt of an excitation light transmitted through said first or second optical input/output line;
(f) a first bypass circuit which allows said signal light to bypass said optical amplifier;
(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;
(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and
(i) a second bypass circuit which allows said signal light to bypass said optical amplifier,
wherein said first optical 3-port circulator is optically connected at its second port to said first optical input/output line, at its third port to said first optical filter, and at its first port to said first bypass circuit,
said second optical 3-port circulator is optically connected at its second port to said second optical input/output line, at its third port to said first bypass circuit, and at its first port to said second optical filter,
said first optical filter is optically connected at its second port to said first optical 3-port circulator, at its third port to said optical amplifier, and at its first port to said second bypass circuit, and
said second optical filter is optically connected at its second port to said second optical 3-port calculator, at its third port to said optical amplifier, and at its first port to said second bypass circuit.

25. An optical-fiber communication system allowing first and second sites to make optical communication therebetween, comprising:
(a) at least one module for amplifying a signal light with a remote excitation-light;
(b) a first optical fiber optically connecting said module to said first site; and
(c) a second optical fiber optically connecting said module to said second site,
said module comprising:

(a) a first optical input/output line through which a signal light is transmitted;
(b) a second optical input/output line through which a signal light is transmitted;
(c) a first optical 3-port circulator having first, second and third ports wherein a signal light input through said second port is output through said third port, a signal light input through said first port is output through said second port, and a signal light input through said third port is not output through any ports;
(d) a second optical 3-port circulator having first, second and third ports wherein a signal light input through said second port is output through said third port, a signal light input through said first port is output through said second port, and a signal light input through said third port is not output through any ports;
(e) an optical amplifier which amplifies a signal light on receipt of an excitation light transmitted through said first or second optical input/output line;
(f) a first bypass circuit which allows said signal light to bypass said optical amplifier;
(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;
(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and
(i) a second bypass circuit which allows said signal light to bypass said optical amplifier,
wherein said first optical 3-port circulator is optically connected at its second port to said first optical input/output line, at its third port to said first optical filter, and at its first port to said first bypass circuit,
said second optical 3-port circulator is optically connected at its second port to said second optical input/output line, at its third port to said first bypass circuit, and at its first port to said second optical filter,
said first optical filter is optically connected at its second port to said first optical 3-port circulator, at its first port to said optical amplifier, and at its third port to said second bypass circuit, and
said second optical filter is optically connected at its second port to said second optical 3-port calculator, at its first port to said optical amplifier, and at its third port to said second bypass circuit.

26. An optical-fiber communication system allowing first and second sites to make optical communication therebetween, comprising:
(a) at least one module for amplifying a signal light with a remote excitation-light;
(b) a first optical fiber optically connecting said module to said first site; and (c) a second optical fiber optically connecting said module to said second site, said module comprising:

(a) a first optical input/output line through which a signal light is transmitted;
(b) a second optical input/output line through which a signal light is transmitted;
(c) a first optical 3-port circulator having first, second and third ports wherein a signal light input through said second port is output through said third port, a signal light input through said first port is output through said second port, and a signal light input through said third port is not output through any ports;
(d) a second optical 3-port circulator having first, second and third ports wherein a signal light input through said second port is output through said third port, a signal light input through said first port is output through said second port, and a signal light input through said third port is not output through any ports;
(e) a first optical amplifier which amplifies a signal light on receipt of an excitation light transmitted through said first or second optical input/output line;
(f) a first bypass circuit which allows said signal light to bypass said first optical amplifier;
(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output,
(h) a second optical filter having first, second and third ports wherein said second port is a port through which a signal light comprised of a signal light having a first wavelength band and a signal light having a second Wavelength band, combined to each other, is input and output, said third port is a port through which a signal light having said first wavelength band is input and output, and said first port is a port through which a signal light having said second wavelength band is input and output,
(i) a second optical amplifier which amplifies a signal light on receipt of an excitation light transmitted through said first or second optical input/output line;
(j) a second bypass circuit which allows said signal light to bypass said second optical amplifier;
(k) a third optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and
(l) a fourth optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output, wherein said first optical 3-port circulator is optically connected at its second port to said first optical input/output line, at its third port to said first optical filter, and at its first port to said fourth optical filter, said second optical 3-port circulator is optically connected at its second port to said second optical input/output line, at its third port to said third optical filter, and at its first port to said second optical filter, said first optical filter is optically connected at its second port to said first optical 3-port circulator, at its third port to said first optical amplifier, and at its first port to said first bypass circuit, said second optical filter is optically connected at its second port to said second optical 3-port circulator, at its third port to said third optical filter, and at its first port to said first bypass filter, said third optical filter is optically connected at its second port to said second optical 3-port circulator, at its first port to said second optical amplifier, and at its third port to said second bypass circuit, and said fourth optical filter is optically connected at its second port to said first optical 3-port calculator, at its first port to said second optical amplifier, and at its third port to said second bypass circuit.

27. An optical-fiber communication system allowing first and second sites to make optical communication therebetween, comprising:

(a) a first module for amplifying a signal light with a remote excitation-light, located at a first site; and
(b) a second module for amplifying a signal light with a remote excitation-light, located at a second site, said second module having the same structure as that of said first module, said first module comprising:

(a) a first optical input/output line through which a signal light is transmitted;
(b) a second optical input/output line through which a signal light is transmitted;
(c) an optical amplifier which amplifies a signal light on receipt of an excitation light transmitted through said first or second optical input/output line;
(d) a bypass circuit which allows said signal light to bypass said optical amplifier;
(e) a first optical 3-port circulator having first, second and third ports wherein a signal light input through said second port is output through said third port, a signal light input through said first port is output through said second port, and a signal light input through said third port is not output through any ports; and
(f) a second optical 3-port circulator having first, second and third ports wherein a signal light input through said second port is output through said third port, a signal light input through said first port is output through said second port, and a signal light input through said third port is not output through any ports, wherein said first optical 3-port circulator is optically connected at its second port to said first optical input/output line, at its third port to said optical amplifier, and at its first port to said bypass circuit, said second optical 3-port circulator is optically connected at its second port to said second optical input/output line, at its third port to said bypass circuit, and at its first port to said optical amplifier, said first optical input/output line is optically connected to said first optical fiber, and said second optical input/output line is optically connected to said second optical fiber, wherein said first optical input/output line of said first module is optically connected to said first optical input/output line of said second module through a first optical fiber, said second optical input/output line of said first module is optically connected to said first site through a second optical fiber, and said second optical input/output line of said second module is optically connected to said second site through a third optical fiber.

28. An optical-fiber communication system allowing first and second sites to make optical communication therebetween, comprising:

(a) a first module for amplifying a signal light with a remote excitation-light, located at a first site; and (b) a second module for amplifying a signal light with a remote excitation-light, located at a second site, said second module having the same structure as that of said first module, said first module comprising:

(a) a first optical input/output line through which a signal light is transmitted;

(b) a second optical input/output line through which a signal light is transmitted;

(c) a first optical 3-port circulator having first, second and third ports wherein a signal light input through said second port is output through said third port, a signal light input through said first port is output through said second port, and a signal light input through said third port is not output through any ports;

(d) a second optical 3-port circulator having first, second and third ports wherein a signal light input through said second port is output through said third port, a signal light input through said first port is output through said second port, and a signal light input through said third port is not output through any ports;

(e) an optical amplifier which amplifies a signal light on receipt of an excitation light transmitted through said first or second optical input/output line;

(f) a first bypass circuit which allows said signal light to bypass said optical amplifier;

(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;

(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and (i) a second bypass circuit which allows said signal light to bypass said optical amplifier, wherein said first optical 3-port circulator is optically connected at its second port to said first optical input/output line, at its third port to said first optical filter, and at its first port to said first bypass circuit, said second optical 3-port circulator is optically connected at its second port to said second optical input/output line, at its third port to said first bypass circuit, and at its first port to said second optical filter, said first optical filter is optically connected at its second port to said first optical 3-port circulator, at its third port to said optical amplifier, and at its first port to said second bypass circuit, and said second optical filter is optically connected at its second port to said second optical 3-port calculator, at its third port to said optical amplifier, and at its first port to said second bypass circuit, wherein said first optical input/output line of said first module is optically connected to said first optical input/output line of said second module through a first optical fiber, said second optical input/output line of said first module is optically connected to said first site through a second optical fiber, and said second optical input/output line of said second module is optically connected to said second site through a third optical fiber.

29. An optical-fiber communication system allowing first and second sites to make optical communication therebetween, comprising:

(a) a first module for amplifying a signal light with a remote excitation-light, located at a first site; and (b) a second module for amplifying a signal light with a remote excitation-light, located at a second site, said second module having the same structure as that of said first module, said first module comprising:

(a) a first optical input/output line through which a signal light is transmitted;

(b) a second optical input/output line through which a signal light is transmitted;

(c) a first optical 3-port circulator having first, second and third ports wherein a signal light input through said second port is output through said third port, a signal light input through said first port is output through said second port, and a signal light input through said third port is not output through any ports;

(d) a second optical 3-port circulator having first, second and third ports wherein a signal light input through said second port is output through said third port, a signal light input through said first port is output through said second port, and a signal light input through said third port is not output through any ports;

(e) an optical amplifier which amplifies a signal light on receipt of an excitation light transmitted through said first or second optical input/output line;

(f) a first bypass circuit which allows said signal light to bypass said optical amplifier;

(g) a first optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output;

(h) a second optical filter having first, second and third ports wherein said second port is a port through which a signal light comprised of a signal light having a first wavelength band and a signal light having a second wavelength band, combined to each other, is input and output, said third port is a port through which a signal light having said first wavelength band is input and output, and said first port is a port through which a signal light having said second wavelength band is input and output; and (i) a second bypass circuit which allows said signal light to bypass said optical amplifier, wherein said first optical 3-port circulator is optically connected at its second port to said first optical input/output line, at its third port to said first optical filter, and at its first port to said first bypass circuit, said second optical 3-port circulator is optically connected at its second port to said second optical input/output line, at its third port to said first bypass circuit, and at its first port to said second optical filter, said first optical filter is optically connected at its second port to said first optical 3-port circulator, at its first port to said optical amplifier, and at its third port to said second bypass circuit, and said second optical filter is optically connected at its second port to said second optical 3-port calculator, at its first port to said optical amplifier, and at its third port to said second bypass circuit, wherein said first optical input/output line of said first module is optically connected to said first optical input/output line of said second module through a first optical fiber, said second optical input/output line of said first module is optically connected to said first site through a second optical fiber, and said second optical input/output line of said second module is optically connected to said second site through a third optical fiber.

30. An optical-fiber communication system allowing first and second sites to make optical communication therebetween, comprising:

(a) a first module for amplifying a signal light with a remote excitation-light, located at a first site; and (b) a second module for amplifying a signal light with a remote excitation-light, located at a second site, wherein said first module is selected from a group consisting of modules defined in claim 2, said second module is selected from a group consisting of modules defined in claim 3, said first optical input/output line of said first module is optically connected to said first optical input/output line of said second module through a first optical fiber, said second optical input/output line of said first module is optically connected to said first site through a second optical fiber, and said second optical input/output line of said second module is optically connected to said second site through a third optical fiber.

31. The optical-fiber communication system as set forth in claim 23, wherein said module further includes at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

32. The optical-fiber communication system as set forth in claim 24, wherein said module further includes at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

33. The optical-fiber communication system as set forth in claim 25, wherein said module further includes at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

34. The optical-fiber communication system as set forth in claim 26, wherein said module further includes at least one optical isolator, and at least one device for compensating for optical dispersion, both arranged between said first optical amplifier and at least one of said first and second optical connectors and/or between said second optical amplifier and at least one of said third and fourth optical connectors, and dispersion compensation in said device is equal to smaller one of first and second factors wherein said first factor is defined as wavelength dispersion stored in a signal light in defined as compensation provided by a dispersion-compensation device having optical loss equal to or smaller than a gain of said module.

35. The optical-fiber communication system as set forth in claim 27, wherein said first module further includes, at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

36. The optical-fiber communication system as set forth in claim 28, wherein said first module further includes at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

37. The optical-fiber communication system as set forth in claim 29, wherein said first module further includes at least one optical isolator, and at least one device for compensating for optical dispersion, both arranged between said optical amplifier and at least one of said first and second optical connectors, and dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

38. An optical-fiber communication system allowing first and second sites to make optical communication therebetween, comprising:
   (a) a first module comprised of a module defined in claim 13; and
   (b) a second module comprised of a module defined in claim 17,
   wherein said first optical input/output line of said first module is optically connected to said first optical input/output line of said second module through a first optical fiber,
   said second optical input/output line of said first module is optically connected to said first site through a second optical fiber,
   said second optical input/output line of said second module is optically connected to said second site through a third optical fiber, and
   dispersion compensation in said device is equal to smaller one of first and second factors wherein said first factor is defined as wavelength dispersion stored in a signal light in said first and second optical fibers, with an error of about 10%, and said second factor is defined as compensation provided by a dispersion-compensation device having optical loss equal to or smaller than a gain of said module.

39. The module as set forth in claim 1, further comprising a first source and a second source for communicating with each other optically,
   wherein a first signal light output from the first source and destined for the second source travels on the first optical input/output line, through the optical amplifier, and then on the second optical input/output line,
   wherein a second signal light output from the second source and destined for the first source travels on the second optical input/output line, then on the bypass circuit, and then on the first optical input/output line, and
   wherein the remote excitation-light travels on the second optical input/output line on its way to the optical amplifier.

* * * * *